(12) United States Patent
Krueger

(10) Patent No.: US 6,641,665 B2
(45) Date of Patent: Nov. 4, 2003

(54) AUTOMATED PRIMING STATION

(75) Inventor: Wallace F. Krueger, Toledo, OH (US)

(73) Assignee: Designetics, Sylvania, OH (US)

( * ) Notice: Subject to any disclaimer, the term of this patent is extended or adjusted under 35 U.S.C. 154(b) by 0 days.

(21) Appl. No.: 10/236,679

(22) Filed: Sep. 6, 2002

(65) Prior Publication Data

US 2003/0000461 A1 Jan. 2, 2003

Related U.S. Application Data

(62) Division of application No. 09/565,908, filed on May 5, 2000, now Pat. No. 6,471,774.
(60) Provisional application No. 60/133,166, filed on May 7, 1999.

(51) Int. Cl.[7] ................................................. B05C 1/02
(52) U.S. Cl. ....................................... 118/264; 118/266
(58) Field of Search ............................... 118/264, 266; 427/429

(56) References Cited

U.S. PATENT DOCUMENTS

| | | | |
|---|---|---|---|
| 3,071,106 A | | 1/1963 | Burelbach et al. |
| 3,974,011 A | | 8/1976 | Jarchow et al. |
| 4,231,668 A | * | 11/1980 | Groth et al. ................ 401/146 |
| 4,605,569 A | | 8/1986 | Shimada et al. |
| 4,660,501 A | | 4/1987 | Nagata et al. |
| 4,747,720 A | | 5/1988 | Bellehumeur et al. |
| 4,790,259 A | | 12/1988 | Morris et al. |
| 4,835,012 A | | 5/1989 | Saur |
| 4,881,563 A | | 11/1989 | Christian |
| 4,947,580 A | | 8/1990 | Moore |
| 5,049,368 A | | 9/1991 | Turner, Jr. |
| 5,131,349 A | | 7/1992 | Keller et al. |
| 5,277,927 A | | 1/1994 | Burns et al. |
| 5,322,566 A | | 6/1994 | Satoh et al. |
| 5,370,905 A | | 12/1994 | Varga et al. |
| 5,480,487 A | | 1/1996 | Figini et al. |
| 5,540,946 A | | 7/1996 | DeVries et al. |
| 5,741,383 A | | 4/1998 | Kneisel |
| 5,743,959 A | | 4/1998 | Ash et al. |
| 5,743,960 A | * | 4/1998 | Tisone ........................ 118/683 |
| 5,799,450 A | | 9/1998 | Sammon et al. |
| 5,816,501 A | | 10/1998 | LoPresti et al. |
| 6,076,522 A | * | 6/2000 | Dwivedi et al. ....... 128/203.15 |
| 6,228,168 B1 | | 5/2001 | Johnson |

OTHER PUBLICATIONS

Brochure published by Sekurit—Las Union GmbH of Aachen entitled Concepts Glazings, Sekurit—Saint Gobain, undated.

\* cited by examiner

*Primary Examiner*—Laura Edwards
(74) *Attorney, Agent, or Firm*—Emch, Schaffer, Schaub & Porcello Co., L.P.A.

(57) ABSTRACT

The automated system includes a fluid dispenser having an applicator tip which is used to apply a fluid to an object. A compliance mechanism is utilized to assist in maintaining the applicator tip of the fluid dispenser in contact with the object during the coating operation. A robot can be utilized to advance the object past the applicator tip during the coating operation. The fluid dispenser is mounted on a movable arm to allow the fluid dispenser to be moved or rotated into and away from the position where fluid is applied to the object. The automated system provides a fluid application system that can apply a precise and repeatable layer of fluid to an object. The use of the robot allows larger objects to be easily handled and for the coating process to be done in a rapid fashion. The automated system is flexible and can readily accommodate changes in the object that is to be coated or the configuration of the coating that is to be applied to the object.

32 Claims, 24 Drawing Sheets

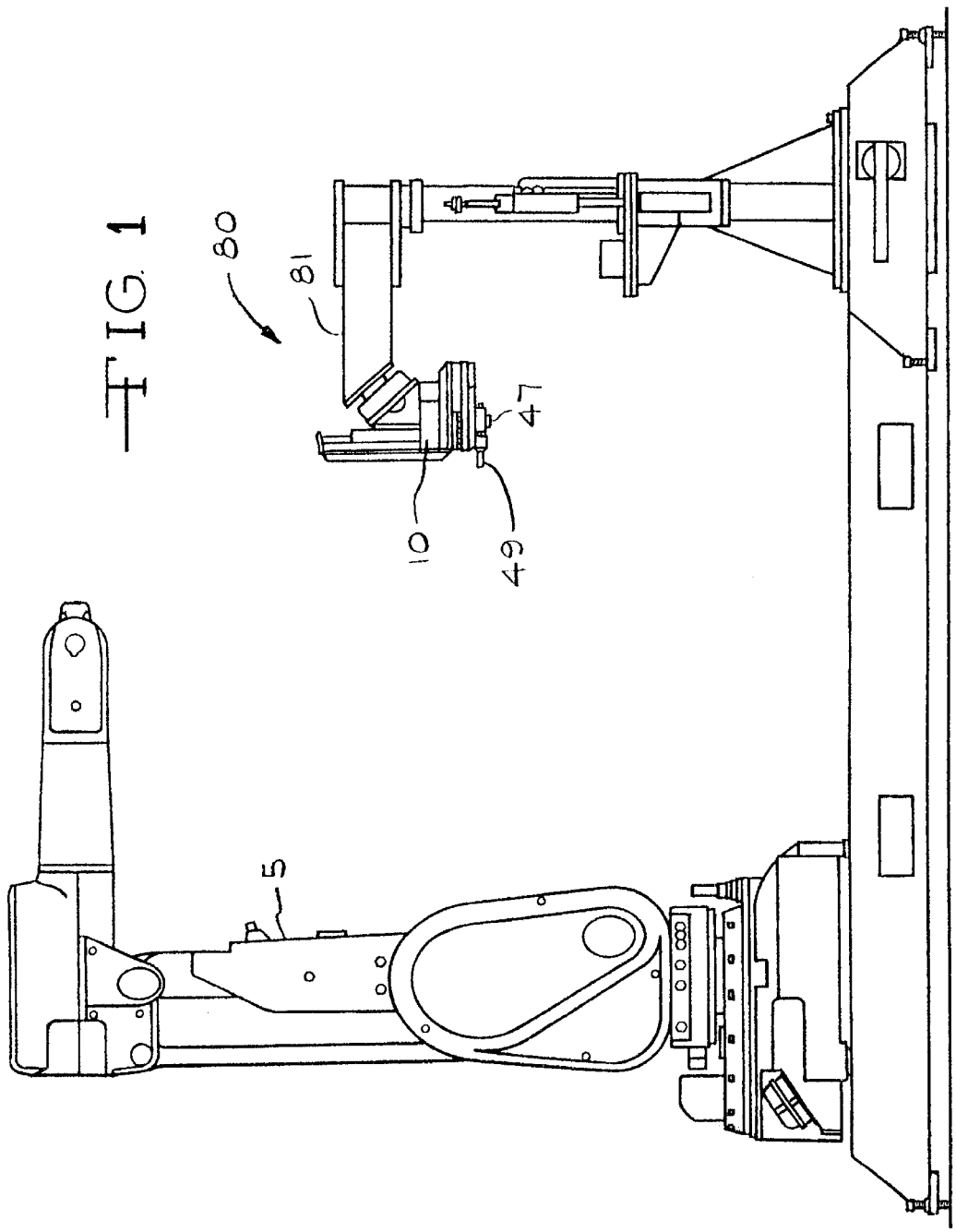

AUTOMATED PRIMING STATION

RELATED APPLICATION

This is a division of U.S. application Ser. No. 09/565,908, filed May 5, 2000 now U.S. Pat. No. 6,471,774. This application claims the benefit of provisional appl. No. 60/133,166 filed May 7, 1999.

FIELD OF THE INVENTION

The invention is directed to an automated system for applying a fluid to an object. The automated system is used to position a fluid applicator in the proper position with respect to the object on which the fluid is being applied. The automated system also has a mechanism for replacing worn fluid applicator tips on the fluid applicator. The automated system utilizes a compliance mechanism that enhances the ability of the automated system to retain contact with the object. The automated system is easily interfaced with robots or other automated devices such as programmable fluid dispensing systems.

One of the primary applications of the automated system is the automotive glass industry where the fluid applicator is used to apply various fluids to the edge of the windshield, lights, and back window. The automated system will be generally described with regard to this particular automotive application. However, it should be understood that these inventions are also suitable for a wide range of other fluid applications. The automotive glass application is only one use and is not meant to limit the scope of the applications for the inventions.

DESCRIPTION OF THE PRIOR ART

The invention is particularly adapted for the production of glazing units or window assemblies for automotive vehicles, although it will find utility generally in a great many other fields. Installation of fixed window units in earlier automotive vehicles generally involved manual installation of the glazing unit using suitable mechanical fasteners such as metal clips for securing the unit in the vehicle body, applying sealant around the marginal edges of the glazing unit, and positioning decorative trip strips around the unit to cover the junction between the marginal edges of the glazing unit and the adjacent portions of the vehicle body. Assembly and installation of such units was relatively slow and costly inasmuch as a considerable amount of labor was required. The procedure was not readily adaptable to being speeded up to accommodate increased automobile production line rates, nor was it adapted to being automated.

Efforts to overcome these disadvantages resulted in numerous improved window structures. Thus, unitary window assemblies were developed wherein a sheet of glass was provided with an adjacent peripheral frame, with a casting or gasket of molded material extending between the frame and the peripheral margin of the window to hold the glass sheet within the frame. Fasteners provided at spaced locations along the frame permitted the entire assembly to be guided into position over an appropriate opening in a vehicle and secured to the vehicle as a unit. Such unitary window units reduce the time required and simplify installation in the vehicle opening. However, due to the labor required in manually assembling the frame and gasket on the sheet of glass, the structures are relatively costly.

More recently, in order to eliminate the manual assembly, so-called encapsulated glazing units have been developed wherein individual sheets of glass or laminated glass units are formed with integral frame or gasket members molded and cured in situ by a reaction injection molding (RIM) process. One such process and resulting product is shown and described in U.S. Pat. No. 4,561,625 to Weaver. Such encapsulated glazing units can be fabricated with a minimum of hand labor, and the resulting units can be readily attached to the portions of the vehicle body defining the window openings during assembly of the vehicle.

As described in the aforementioned patent, such encapsulated units are fabricated by disposing a predetermined portion of the marginal periphery of a sheet of transparent material within a mold structure. A polymeric gasket forming material is injected into the mold cavity and cured in situ on the sheet to encapsulate the marginal peripheral edge portion of the sheet. The resulting assembly can then be readily attached to the body portion defining the periphery of a window opening during manufacture and assembly of a vehicle.

Due to the nature of the glass surfaces, it is known that the gasket materials may not form a permanent, long term bond directly to the glass. Thus, they may not maintain adhesion to the glass surface for a length of time consistent with the life of the automobile. Exposure to weather moisture and sunlight, as well as other factors, may cause the gasket material to loosen from the glass with the passage of time, and ultimately to separate entirely from the glass. In order to improve the adherence of the gasket material to the glass and increase the service life of the encapsulated units to an acceptable level, it has been common practice to apply a coating of a liquid primer material to the affected surface of the glass prior to formation of the gasket thereon. Heretofore, this has been accomplished as by manually painting a band of the primer material along the appropriate edge portion of the glass panel. Such prior art procedures may, for example, utilize a brush periodically dipped in a container of the primer material, or a plastic squeeze bottle containing the primer material and having a suitable dispensing dober. In any event, the procedures are not entirely satisfactory in that they are time-consuming, labor-intensive and may not result in a satisfactory coating of the primer material. Thus the primer layer, which is generally a urethane material, should be applied as a uniform, continuous, relatively thin band in order to function properly. Should the layer be of excessive thickness, it may separate within the layer along a cleavage plane, resulting in failure of the bond. Of course, if the layer is not of sufficient thickness or if certain areas are not coated, the primer layer would likewise be ineffective for its intended purpose. The primer, and particularly the solvent therefore, may be toxic in nature so that manual application thereof, particularly when using an open container of the primer, may require use of protective equipment by the workers. Such manual application processes also generally result in waste of the primer material and generally messy conditions in the work place. Due to the difficulty in controlling the width of manually applied bands, it may also be necessary to mask the work piece prior to application of the primer material.

Thus, as will be readily apparent, the existing procedures for applying primer material to the edges of sheet material are not entirely satisfactory, and there is a need for a system for efficiently applying a band of primer of a desired uniform thickness and width to such sheet material.

SUMMARY OF THE INVENTION

This invention consists of a modular workstation that is interfaced with a programmed robot to apply a liquid to a product, primarily glass, in a precision pattern, utilizing specialized and unique flow applicator tips. Some of the applicator tip designs have been documented in U.S. Pat. No. 5,131,349.

In accordance with the present invention, there is provided a system for applying a uniform band of primer composition along selected portions of the peripheral margin of sheet material such as glazing units of the like. The band may be applied to either or both marginal surfaces, as well as to the edge portion and to interior marginal surfaces of spaced adjacent sheets where desired. The invention has particular utility in applying such bands of primer composition to the marginal edges of glazing unit upon which a plastic frame or gasket member is to be molded in place. However, as will be readily appreciated, it may as well be utilized for application of bands of liquid material in general to any suitable marginal surface.

A family of interchangeable applicator tips is provided for use with a dispenser adapted to provide an on-demand supply of primer compound to the tip in use. The different applicator tips of the family have configurations particularly adapted to applying bands of primer compound along selected peripheral margins of a sheet member, and each is of composite construction including a relatively rigid base member to which is bonded a soft wicking and absorbent body for contacting and transferring to the sheet surface the layer of primer compound. The tips are readily attachable to and removable from a fluid dispenser or other dispensing unit providing a supply of the primer compound. The fluid dispenser, or a plurality of the fluid dispensers, may be incorporated in a modular work station including a closed storage and supply container for the primer compound and a solvent flush system for cleaning hoses and fluid dispenser of the reaction priming resins. The fluid dispenser may also be mounted upon an oscillating carriage whereby in one position of the carriage, spent applicator tips are removed and replaced by new tips by a loader, and in another position the marginal edges of glazing units are moved through the applicator tips by a robot arm for application of a band of the priming compound.

The operational design consists of a column or post-like structure that houses a shaft that rotates or indexes in this structure. Two arms that are positioned 90° apart are mounted on the top of the shaft. At the end of these two arms, a fluid dispenser is mounted to a compliance fixture. Two cantilevered beams are attached to the column housing in spaced apart and parallel relationship to the rotating arms. Upon these beams are mounted articulated fixtures to remove spent applicator tips from the fluid dispenser and then reattach a new applicator tip.

The object upon which the fluid is to be applied is usually on a robot. The object is then moved by the robot relative to the fluid dispenser to apply the fluid coating to the desired areas on the object. Devices other than a robot can also be used to provide the movement of the object during the fluid application process.

The design and the unique operational programmable functions, provide precision liquid lay down on glass and other products in a controlled and rapid automatic production cycle. This design with the employment of two fluid applicators on separate indexing arms provides many advantages such as:

1. The ability to apply, with precision, fluid primers that consist of two liquid products that must be applied in precise band width, volume, mil thickness, sequence, etc.;
2. The ability to use the same liquid within both fluid dispensers, but employ different applicator tips to give variable lay down;
3. A means to clean the surface before the lay down of primer, activator, adhesives, etc.;
4. The ability to use any combination of two pairs of applicators and any combination of two liquids; and
5. The unit can be used with only one arm and applicator tip.

In the process to apply primers, adhesives, promoters, etc. to automotive glass and like application, it is necessary to maneuver the specialized tip applicators into many angular modes to provide constant regulated pressure contact with the glass. It is also necessary to maintain band width coverage on all designated surfaces and at the same time control the mil thickness of the fluid that is applied to meet the required quality standards.

There are many applications where the design of the product demands a non-uniform and constant changing band width on one or two edges or on one or both sides of the light and/or a mixture of these variables on a single piece of glass. To accomplish such requirements, it is frequently necessary to employ two different applicator tip designs. On one portion of the product, it may be necessary to have a vertical placement of the applicator tip with respect to the product. On another section of the product, it may be necessary to use the applicator tip in a horizontal mode. Many design factors of the product dictate the ability or inability to perform the required liquid lay down in one automated cycle.

The capability to perform this type of complex pattern for liquid application in a rapid, single automatic cycle has been accomplished with the design of the compliance mechanism that can rotate within its mounting to position the fluid dispenser in either a vertical or horizontal position or an angular position between vertical and horizontal.

It is accordingly an object of the invention to provide a device for applying a uniform band of primer material to selected peripheral marginal areas of a sheet member.

Another object of the invention is to provide such a device which minimizes waste of the primer or adhesion promoting material.

Another object of the invention is to provide such a device which is adapted to apply a primer material along the peripheral margin of either or both major surfaces of the sheet member, the edges thereof, and the interior peripheral margins of a pair of spaced sheet members.

Another object of the invention is to provide a device and system of operation where different fluids can be applied to the object that is to be coated and the fluids are applied in a predetermined sequential manner.

Still another object of the invention is to provide such a device requiring a minimum of manual labor in its operation.

Yet another object of the invention is to provide such a device utilizing a closed supply system so as to minimize escape of solvent materials at the work station and entry of moisture to sensitive reactive fluids.

Another object is to provide precision metering to maintain set parameters of material usage.

Other objects and advantages of the present invention will become apparent to those skilled in the art upon a review of the following detailed description of the preferred embodiments and the accompanying drawings.

BRIEF DESCRIPTION OF THE DRAWINGS

FIG. 1 is a side elevation view of the work station and showing the compliance mechanism of the invention.

DETAILED DESCRIPTION OF THE PREFERRED EMBODIMENT

Figure 4:
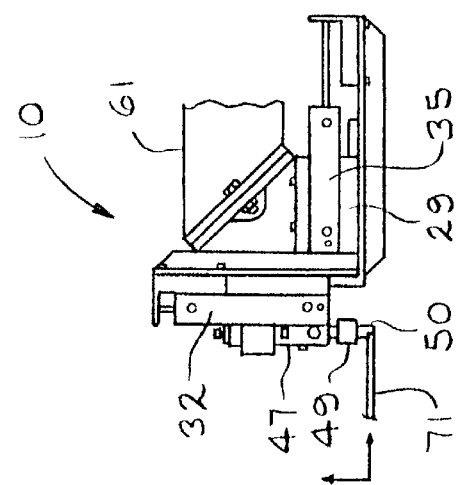
FIG. 4 is a side elevation view of the compliance mechanism.

The invention is directed to an automated system for applying a fluid to an object. The automated system utilizes a compliance mechanism that enhances the ability of the automated system to retain contact with the object. The automated system is easily interfaced with robots or other automated devices such as programmable fluid dispensing systems. The features of the invention will be more readily understood by referring to the attached drawings in combination with the following description of the invention.

FIG. 1 shows the automated system 80 of the present invention where a fluid dispenser 47 having an applicator tip 49 is used to apply a fluid to an object (not shown). A compliance mechanism 10 is utilized to assist in maintaining the applicator tip 49 of the fluid dispenser 47 in contact with the object during the coating operation. A robot 5 having an arm 13 is utilized to advance the object past the applicator tip 49 during the coating operation. The fluid dispenser 47 is mounted on a movable arm 81 to allow the fluid dispenser to be moved or rotated into and away from the position where fluid is applied to the object. The automated system 80 provides a fluid application system that can apply a precise and repeatable layer of fluid to an object. The use of the robot 5 allows larger objects to be easily handled and for the coating process to be done in a rapid fashion. The automated system is flexible and can readily accommodate changes in the object that is to be coated or the configuration of the coating that is to be applied to the object. The specifics of the automated system and components that comprise this system will now be described in detail.

The compliance mechanism 10 shown in FIGS. 2–7 has an L-shaped bracket 15 having a first leg 17 and a second leg 19. The first and second legs 17 and 19 are positioned substantially perpendicular to one another. A first reinforcing member 21 is secured to the first leg 17 and to a portion of the second leg 19 which is adjacent to the first leg 17. The first reinforcing member provides additional support and rigidity for the first leg 17. The second reinforcing member 25 is secured to the second leg 19 and provides additional rigidity and support for the second leg 19. A slide mechanism 29 such as a linear ball bearing is positioned on the first leg 17 on the side of the leg that is opposite to the first reinforcing member 21. A slide mechanism 29 is also positioned on the second leg 19 on the side that is opposite the second reinforcing member 25. A first fluid pressure actuation drive means such as a fluid operated cylinder 32 is secured to the slide mechanism 29 on the first leg 17. A second fluid pressure actuation drive means such as a fluid operated cylinder 35 is secured to the slide mechanism 29 positioned on the second leg 19. The first and second fluid operated cylinders 32 and 35 are dual acting cylinders with fluid supply ports 37 located at each end of the cylinders. In practice, it has been found preferable to use low friction fluid operated cylinders for the compliance mechanism. In particular, glass lined low friction fluid operated cylinders have been found to work particularly well. However, other types of low friction cylinders can also be utilized. The fluid supply ports are disposed for supplying fluid to either side of the piston (not shown) located in the interior of the cylinders. A piston rod 39 is connected to the piston and extends from one end of the cylinders. The piston rod 39 of the first fluid operated cylinder 32 is secured to a first bracket 41 that extends from the first leg 17 in a direction substantially perpendicular to the first leg 17. The first bracket 41 extends from the side of the first leg 17 that is opposite to the first reinforcing member 21. The first bracket 41 is also disposed to be substantially parallel to the second leg 19. The piston rod 39 for the second fluid operated cylinder 35 is secured to a second bracket 43 that extends from the second leg 19. The second bracket 43 extends from the second leg 19 in a direction that is substantially perpendicular to the second leg 19. The second bracket 43 extends from the side of the second leg 19 that is opposite to the second reinforcing member 25. The second bracket 43 is disposed to be substantially parallel to the first leg 17.

Figure 8:
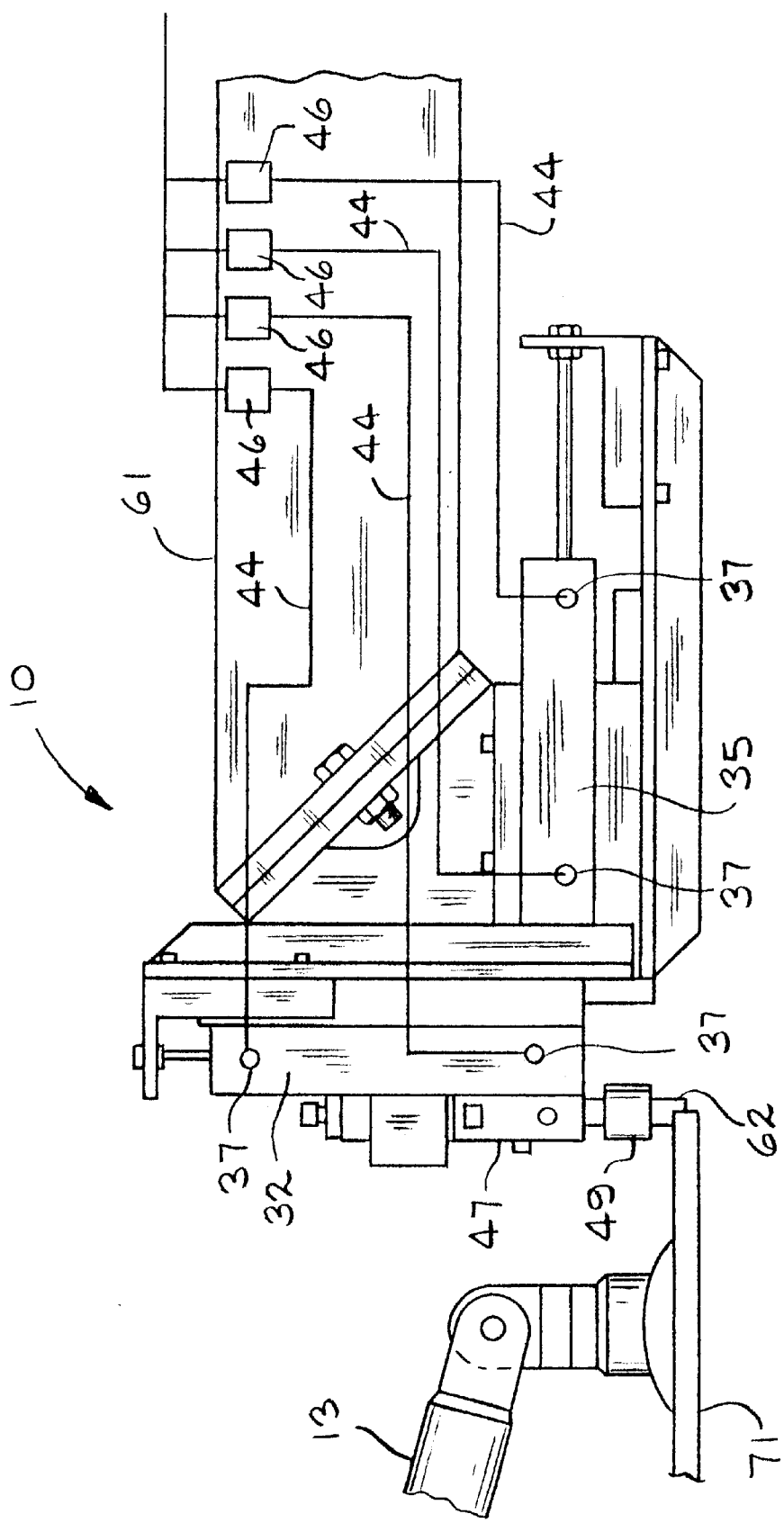
FIG. 8 is a side elevation view of another feature of the compliance mechanism invention.

As shown in FIG. 8, the first and second fluid operated cylinders 32, 35 are supplied with fluid under pressure to actuate the cylinders, through supply lines 44. Each supply line 44 is connected to a self-exhausting regulator 46. The supply lines extend from the regulators and are connected to one of the fluid supply ports 37 on the first and second fluid operated cylinders. The regulators 46 act to reduce pressure build up in the first and second fluid operated cylinders 32, 35 so that the force necessary to advance the piston rod in the cylinders does not change over the distance of travel for the rod.

A fluid dispenser 47 having a fluid applicator tip 49 is secured to the first fluid operated cylinder 32. An example of a fluid dispenser that can be used is the Model 5000 fluid dispenser sold by Designetics. The fluid dispenser 47 is positioned on the first fluid operated cylinder 32 so that the fluid applicator tip 49 extends beyond the end of the first fluid operated cylinder 32. The fluid applicator tip 49 usually extends beyond the end of the first fluid operated cylinder 32 that is opposite to the end where the piston rod 39 extends from the cylinder. The fluid applicator tip 49 is constructed to have a guide flange 62 that engages the edge of the object 71 that is to be coated with fluid to position the fluid applicator tip with respect to the object 71. The fluid applicator tip 49 usually contacts at least one other surface of the object. The applicator tip 49 usually has a felt or foam pad that applies the fluid to the object that is to be coated. The applicator tip 49 applies fluid to the object in a manner well known in this field. Examples of applicator tips 49 that can be used with this invention are Part Numbers Series 11 through Series 67 sold by Designetics.

In some applications the applicator tip 49 may not have guide flange 62 to position the applicator tip with respect to the object 71. In this situation, the applicator tip 49 will have to be placed very precisely with respect to the object 71 so that the fluid layer is applied to the desired area. Since the applicator tip 49 only engages one surface of the object, the compliance mechanism 10 will only be able to effectively accommodate relative movement between the applicator tip 49 and the object 71 in one direction. In this application, it is only necessary to have the fluid operated cylinder that controls motion in the one selected direction be operational. Usually, the fluid operated cylinder that does not control motion in the desired direction would be effectively locked to prevent motion in a direction that is not controlled by the position of the applicator tip 49.

As shown in FIGS. 2–7, the second fluid operated cylinder 35 is secured to a bar 53. A flange 55 is secured to and extends from the bar 53. The end of the flange 55 that is spaced apart from the bar 53 is disposed at an angle with respect to the bar 53 and a positioning plate 57 is secured to this end of the flange 55. The positioning plate 57 is also disposed at an angle with respect to the bar 53. The positioning plate 57 is releasably secured to positioning member 59 that is connected to a support arm 61. The positioning member 59 is disposed at the same angle with respect to the support arm 61 that the positioning plate 57 is disposed at with respect to the flange 55. A releasable securing means 63 such as a bolt 65 and a nut 67 is used to releasably secure the positioning plate 57 to the positioning member 59. In practice, it has been found to be preferable that the positioning member 59 and positioning plate 57 be disposed at a 45° angle.

Figure 3:
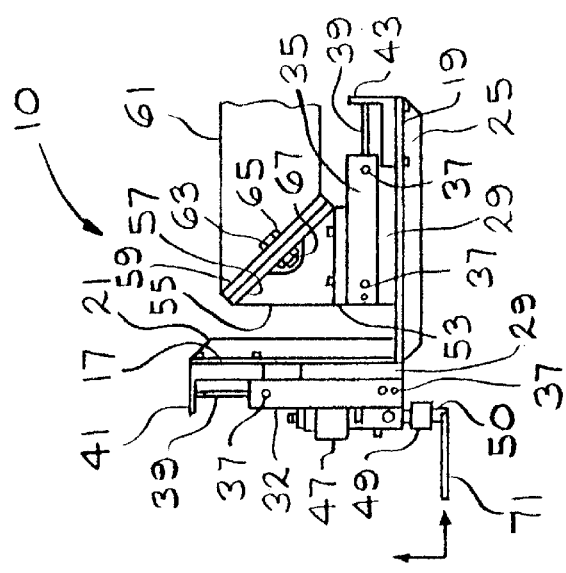
FIG. 3 is a side elevation view of the compliance mechanism.
Figure 2:
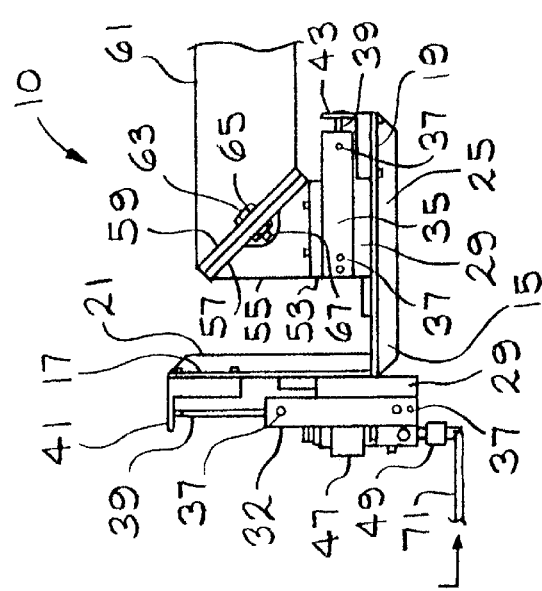
FIG. 2 is a side elevation view of the compliance mechanism of the invention.
Figure 5:
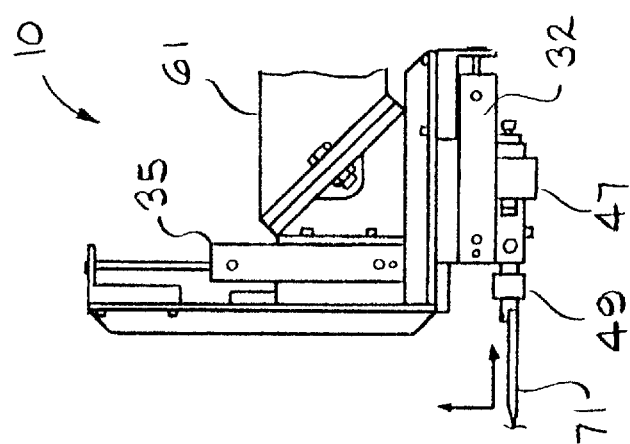
FIG. 5 is a side elevation view of the compliance mechanism.
Figure 6:
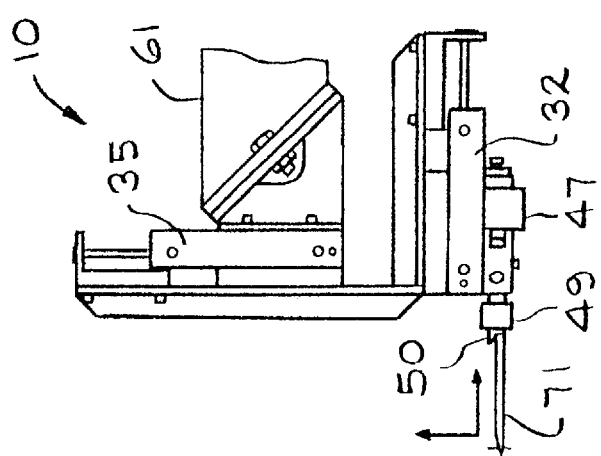
FIG. 6 is a side elevation view of the compliance mechanism.
Figure 7:
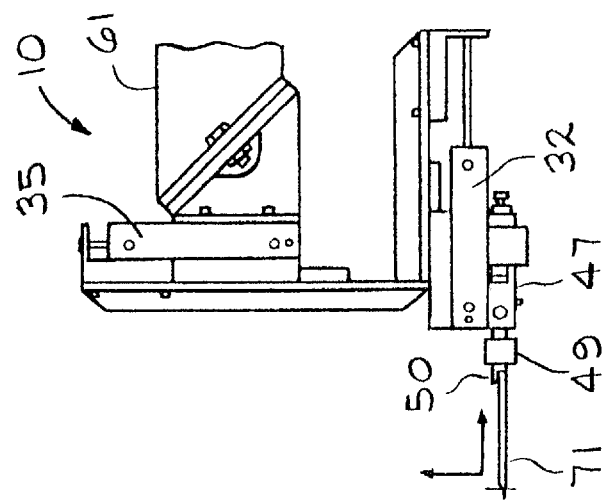
FIG. 7 is a side elevation view of the compliance mechanism.

FIGS. 2–4 show the compliance mechanism 10 with the fluid dispenser positioned in a vertical orientation. FIGS. 5–7 show the compliance mechanism 10 with the fluid dispenser positioned in a horizontal orientation. It should be understood that the fluid dispenser will work satisfactorily in either orientation or in any position between these two orientations.

In operation, the compliance mechanism 10 is utilized to place a fluid layer or strip on an object that is positioned adjacent the compliance mechanism. Usually, the object is moved with respect to the compliance mechanism during the fluid application process. However, it is also possible for the compliance mechanism to be moved relative to the object during the coating process.

To begin the coating process, the compliance mechanism 10 is positioned in the configuration shown in FIG. 2 which is a biased position for the compliance mechanism. In the position shown in FIG. 2, the first fluid operated cylinder 32 and the second fluid operated cylinder 35 are positioned at the end of the length of stroke for the cylinders. This is accomplished by supplying fluid to the fluid supply ports 37 on each side of the piston (not shown) located in the cylinders so that the piston is advanced to substantially its fully extended position for each of the cylinders. The first and second fluid operated cylinders are low friction cylinders and only a very small force is required to operate or move the piston in the cylinders. The piston rod 39 that is connected to the piston in the first fluid operated cylinder 32 is connected to the first tab 41 that extends from the first leg 17. As the piston is advanced in the first fluid operated cylinder 32, the piston rod 39 will be caused to extend or retract into the first fluid operated cylinder 32 by the movement of the piston. Since the piston rod 39 is connected to the first tab 41, this causes the first fluid operated cylinder 32 to be advanced with respect to the first leg 17. Since the first fluid operated cylinder 32 is mounted on slide mechanism 29 that has very little resistance to movement, it is very easy to advance the first fluid operated cylinder with respect to the first leg 17. The second fluid operated cylinder 35 is supplied with fluid through the fluid supply ports 37 in the manner just described for the first fluid operated cylinder 32 and as described above, it only requires a very small force to advance the piston (not shown).

Once the first fluid operated cylinder 32 and the second fluid operated cylinder 35 are positioned as shown in FIG. 2, the weight of the fluid dispenser 47 and the fluid pressure for the fluid supplied to the fluid supply ports 37 will essentially control the resistance to movement for the first and second fluid operated cylinders. When the object 71 is positioned in contact with the fluid applicator tip 49 on the fluid dispenser 47, it is desirable to maintain the fluid applicator tip in contact with the object during the application process. In most applications, the object 71 has a change of shape, contour or there are irregularities in the object that it is necessary for the fluid applicator tip to move in both a horizontal and vertical direction to maintain contact with the object 71.

The fluid applicator is connected to a fluid supply system and an example of a suitable fluid supply system is described in U.S. Pat. No. 5,131,349 and generally identified by reference numeral 93 of the '349 patent. The description of this fluid supply system described in U.S. Pat. No. 5,131,349 is hereby incorporated by reference into this patent application. However, it should be understood that other fluid supply systems could also be utilized with the present invention and such other systems will be described later.

When the coating operation begins, the object 71 is brought into position adjacent the fluid applicator tip 49. The object is then moved to engage the applicator tip 49. The object 71 causes the applicator tip 49 and fluid dispenser 47 to move to substantially the position shown in FIG. 3. This is the central or neutral position for the first and second fluid operated cylinders 32, 35. From the position shown in FIG. 3, the fluid applicator tip 49 can be advanced or retracted in two directions a relatively equal amount to accommodate changes presented by the object 71 during the fluid application process. The fluid supplied to the fluid supply ports 37 on the first and second fluid operated cylinder 32, 35 are balanced in a way so there is a slight bias on the cylinder in the direction toward the object 71. The amount of the bias can be controlled by the pressure differential of the fluid supplied to either side of the piston in the first fluid operated cylinder 32 and second fluid operated cylinder 35. The self-exhausting regulators 46 substantially eliminate pressure buildup in the first and second fluid operated cylinders 32, 35 during the operation of the cylinders. The regulators 46 assist in having the biasing force maintained at substantially the desired level as the first and second fluid operated cylinders 32, 35 are caused to move during the operation of the compliance mechanism 10. In most applications, the biasing pressure differential is relatively small since a light biasing force is all that is necessary to properly position the fluid applicator tip. Also, it is important that the biasing force created by the pressure differential does not unduly restrict the ability of the first fluid operated cylinder 32 to move with respect to the object 71.

In practice, it has been found that a biasing force of from about 5 ounces to about 40 ounces works well in keeping the application tip 49 in contact with the object that is being coated. It has been found especially preferable to utilize a biasing force from about 12 ounces to about 36 ounces to keep the applicator tip 49 in contact with the object that is being coated. This low biasing force creates a feather light touch that allows the applicator tip to work most effectively. The light contact between the applicator tip 49 and the object also prolongs the life of the applicator tip. The overall speed will also dictate resistive force, especially around corners.

When the object 71 is being coated by the fluid applicator tip 49, any movement away from the fluid applicator tip in a vertical direction will result in the first fluid operated cylinder 32 moving toward the object 71 due to the biasing force in the first fluid operated cylinder. If the object 71 moves in a vertical direction toward the fluid applicator tip 49, the first fluid operated cylinder 32 will move in the same direction as the object 71 and keep the fluid applicator tip 49 in contact with the surface of the object 71. Since the biasing force in the first fluid operated cylinder 32 is relatively small, only a small amount of pressure is necessary to cause the fluid dispenser 47 and the first fluid operated cylinder 32 to move in response to the change in position of the object 71. The small biasing force in the first fluid operated cylinder 32 results in a very light touch or feel for the applicator tip 49 on the object 71. Since the first fluid operated cylinder 32 is a low friction cylinder and is mounted on the slide mechanism 29, there is almost no resistance to movement of the first fluid operated cylinder 32 other than the biasing force in this cylinder.

If the object 71 moves away from the second fluid operated cylinder 35, the biasing force in this cylinder will cause the second fluid operated cylinder 35 to move toward the object and keep the applicator tip 49 in contact with the object 71. If the object 71 moves in a direction toward the second fluid operated cylinder 35, it is only necessary to overcome the biasing force in this cylinder to cause the second fluid operated cylinder 35 to move with the object 71 and maintain the fluid applicator tip 49 in the desired position with respect to the object.

FIG. 2 and FIG. 4 show the range of motion for the fluid dispenser 47 in vertical and horizontal direction. In practice, it has been found that this range of motion is satisfactory to accommodate most objects 71 on which a fluid is applied.

In some applications, it may be necessary to have a stronger biasing force in the first fluid operated cylinder 32 and the second fluid operated cylinder 35 to maintain proper positioning for the fluid dispenser 47 to achieve the desired application of the fluid. If higher pressures are required, it is only necessary to adjust the fluid pressures in the first and second fluid operated cylinders 32, 35 to increase the resistance of movement in the cylinders and achieve the desired fluid applicator tip pressure on the object 71.

It is frequently necessary to change the angular position of the fluid dispenser 47 to apply a fluid in a desired manner to an object 71. To change the positioning of the fluid dispenser 47, it is only necessary to loosen the releasable securing means 63 and change the orientation of the positioning plate 57 with respect to the positioning member 59. As shown in FIGS. 5, 6 and 7, the positioning plate 57 has been rotated relative to the positioning member 59 so that the fluid dispenser 47 is now disposed in a horizontal orientation instead of the vertical orientation shown in FIGS. 2, 3 and 4. It is possible to locate the fluid dispenser 47 in other positions between the positions shown in FIGS. 2, 3 and 4 and the positions shown in FIGS. 5, 6 and 7. Once the desired position is obtained for the fluid dispenser 47, the releasable securing means is tightened to maintain the positioning plate 57 in the desired position with respect to the positioning member 59.

Figure 25:
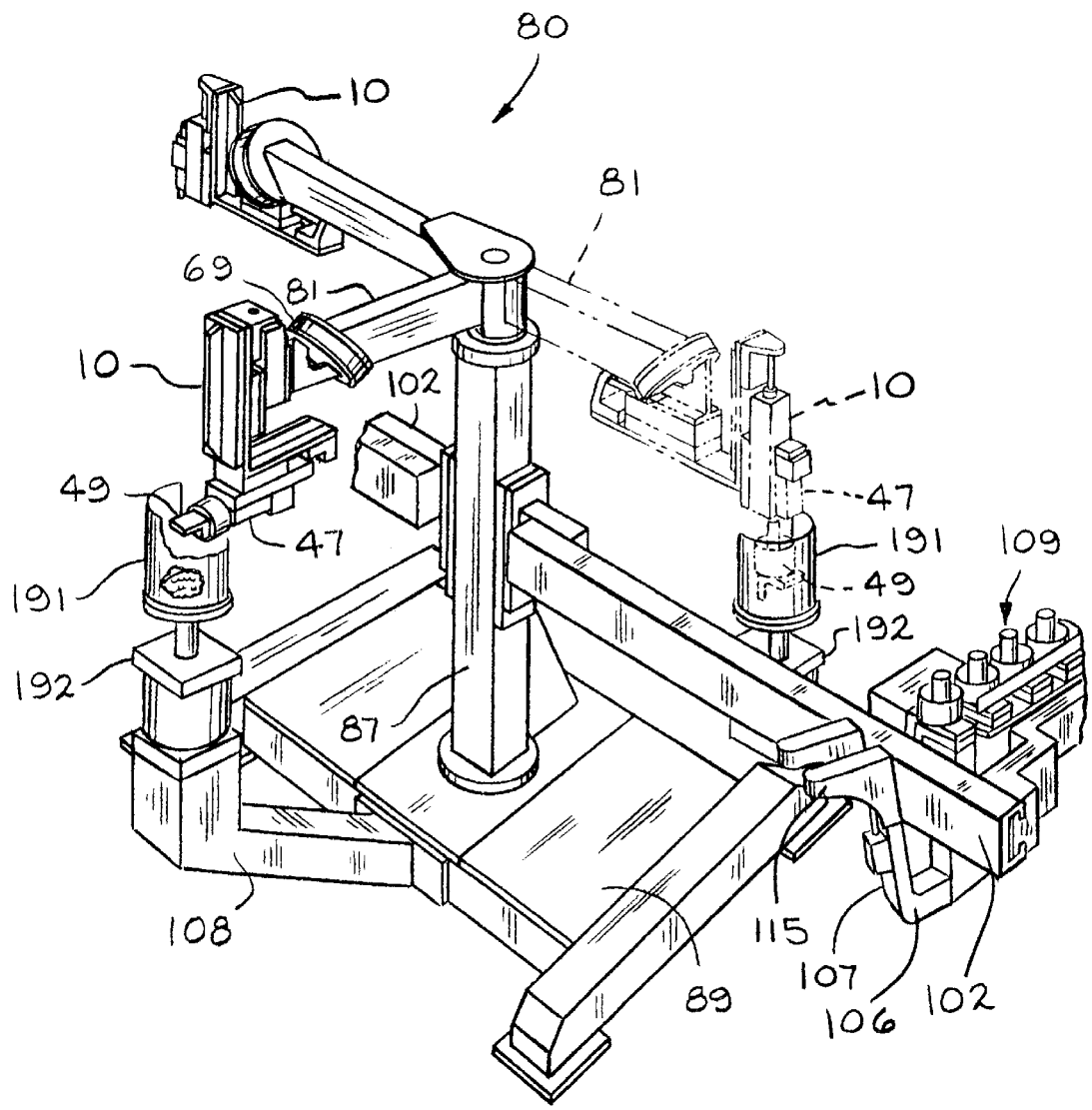
FIG. 25 is a perspective view of the automated system.

As shown in FIG. 25, a rotary actuator 69 can be positioned on each movable arm 81 of an automated system 80. The rotary actuators 69 can be used to position the fluid dispenser 47 and applicator tip 49 positioned on each arm in a vertical orientation (as shown on the right side of FIG. 25) or in a horizontal orientation (as shown on the left side of FIG. 25). As shown in this figure, the rotary actuators 69 can change the orientation of the fluid dispensers 47 and applicator tip 49 as the movable arms 81 position the fluid dispenser and applicator tip in different locations.

Figure 9:
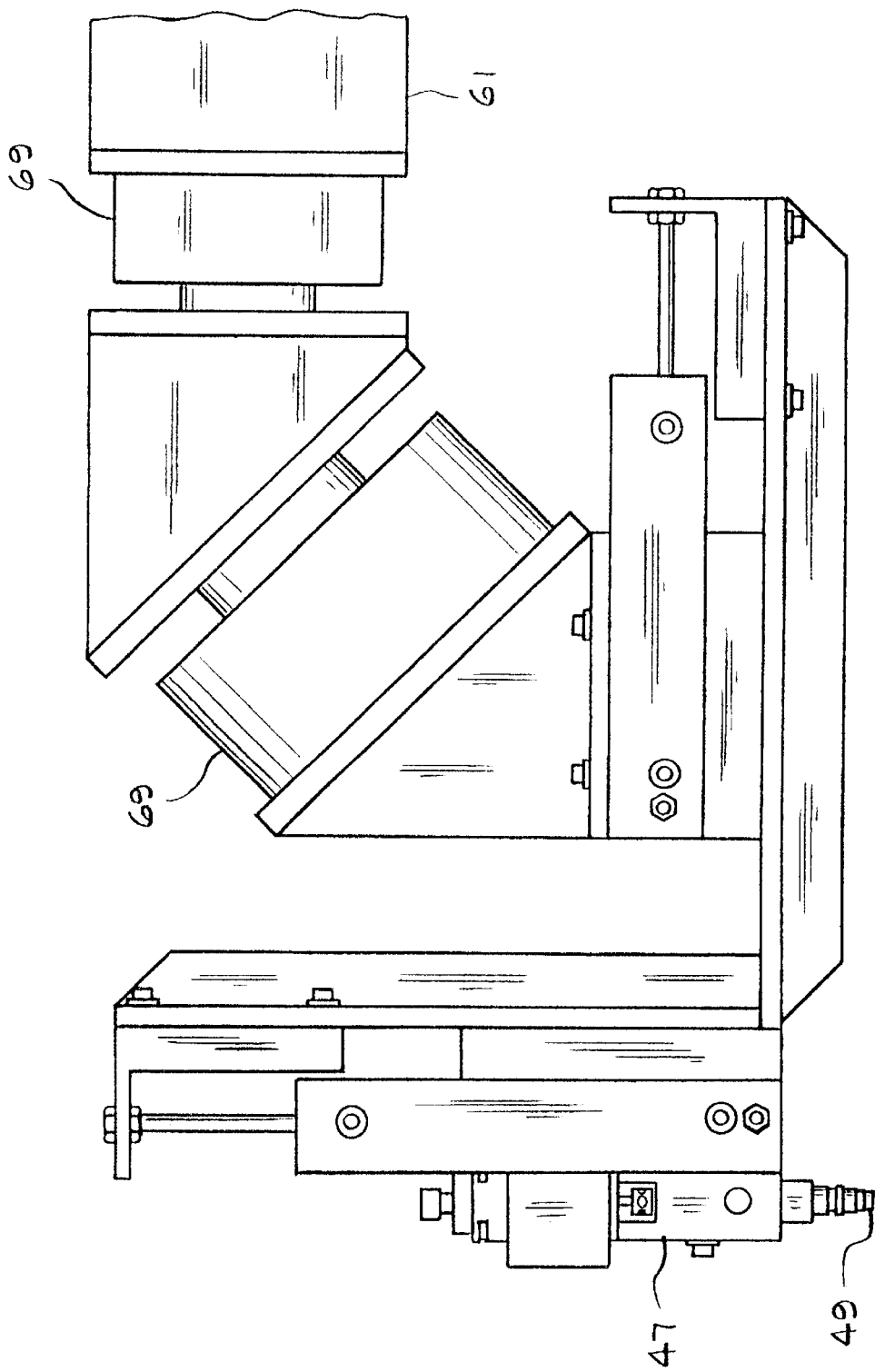
FIG. 9 is a side elevation view of another feature of the invention.

As shown in FIG. 9, it is also possible to use one or more rotary actuators 69 to position the fluid dispenser 47 and fluid applicator tip 49 in the desired position. The rotary actuator 69 replaces the positioning member 59 previously described as a mechanism for angularly positioning the fluid dispenser 47. The rotary actuator 69 usually contains a motor or fluid actuated mechanism that rotates the rotary actuator to the desired position. A control means (not shown) can be used to select the desired position for the rotary actuator and the fluid dispenser 47.

As shown in FIGS. 7 and 9 the compliance mechanism previously described can be utilized on an automated system for applying fluid to an object. In this application, the compliance mechanism 10, fluid dispenser 47 and fluid applicator tip 49 are positioned on an arm 61. The arm 61 can be movable and be used to move the fluid dispenser 47 into position so that it is adjacent the object 71 on which fluid is to be applied. The object 71 can be moved to the desired position for fluid application by the use of a robot or other suitable positioning means. The robot 73 can be used to advance or rotate the object 71 with respect to the applicator tip 49 during the application of the fluid to the object.

Figure 10:
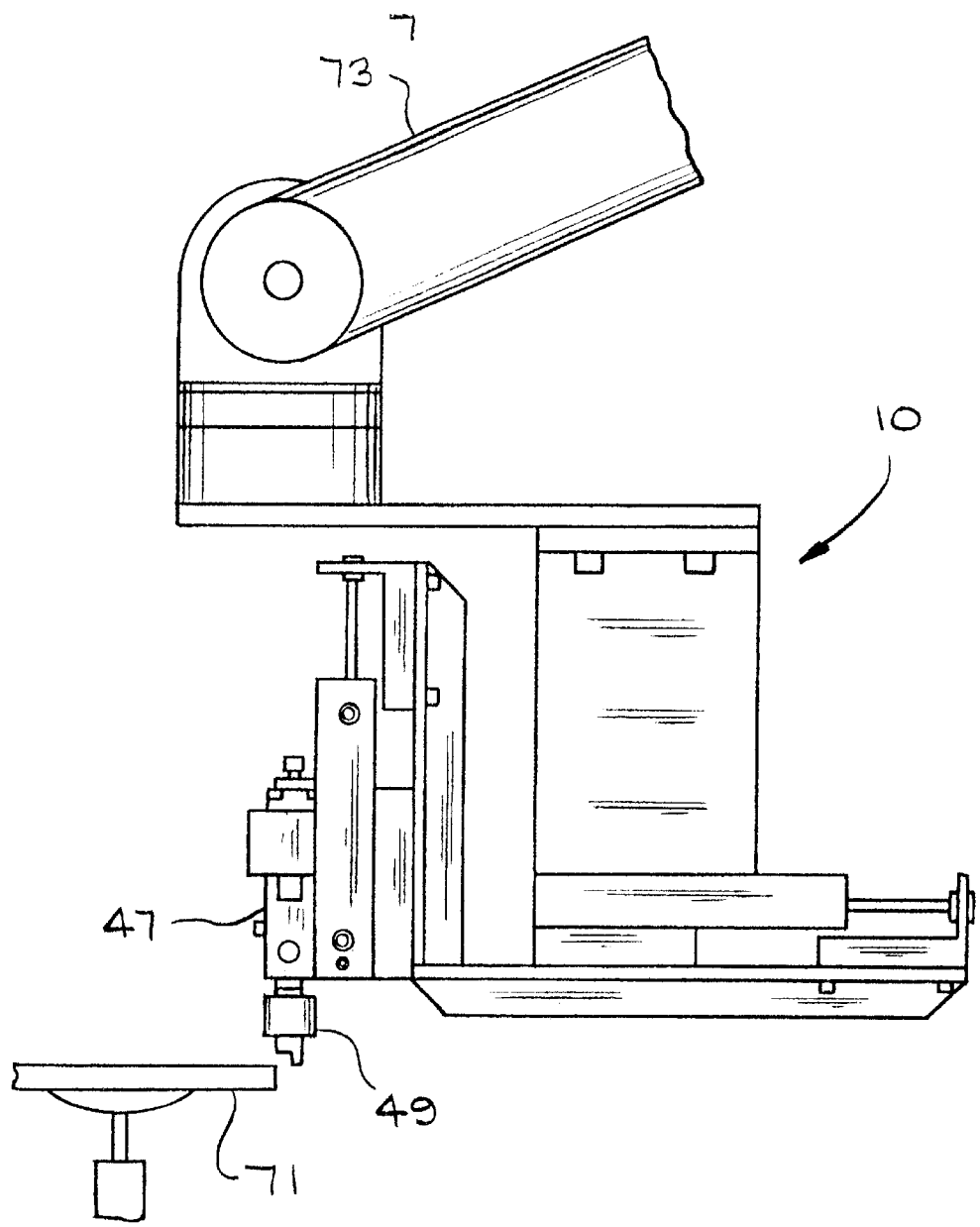
FIG. 10 is a side elevation view of another feature of the invention.
Figure 11:
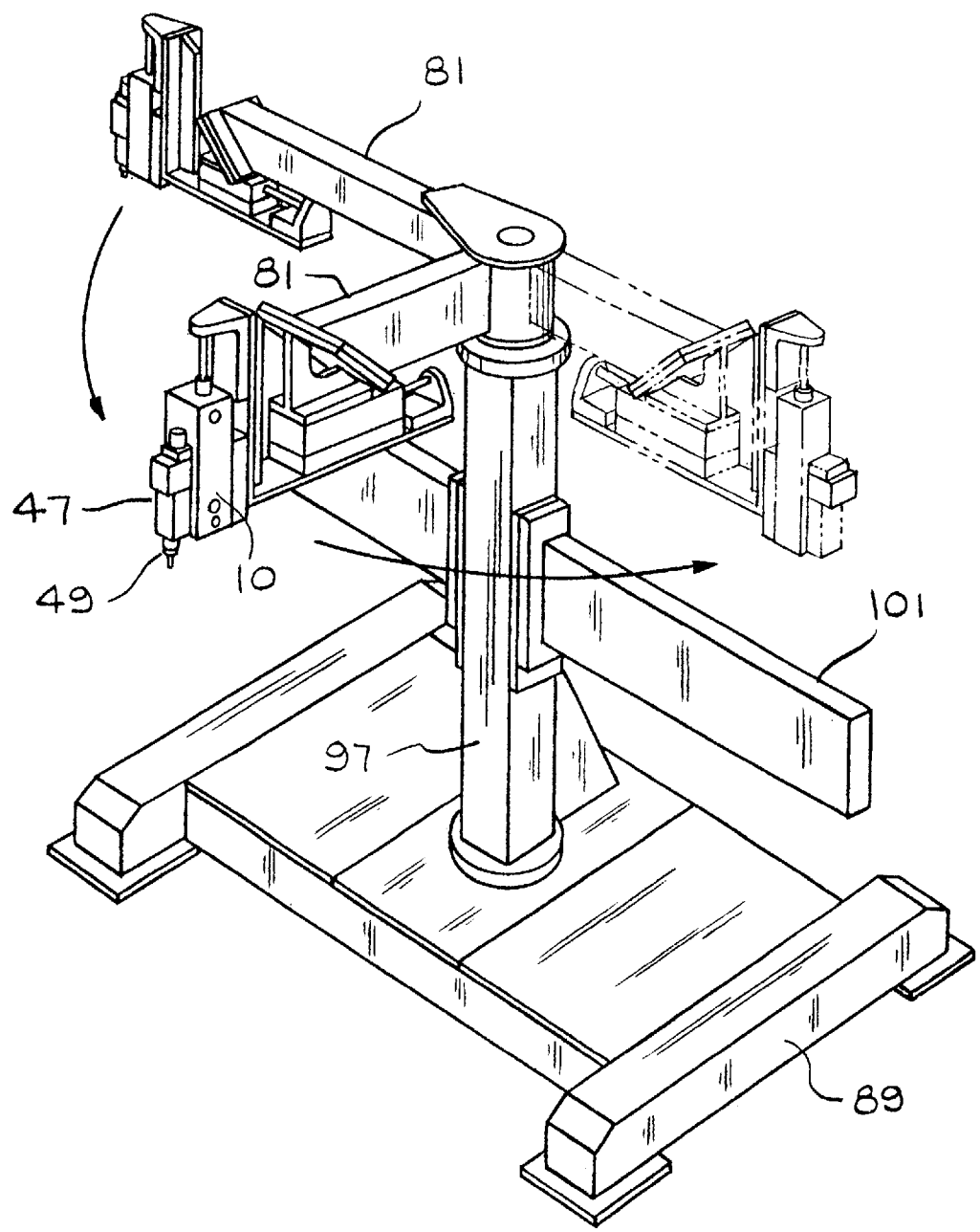
FIG. 11 is a perspective view of the automated system.

As shown in FIG. 10, the compliance mechanism 10, fluid dispenser 47 and fluid applicator tip 49 are positioned on or connected to a robot 73. The robot 73 is used to position the fluid dispenser 47 and fluid applicator tip 49 into position adjacent the object 71 on which the fluid is to be applied. The robot 73 can be used to advance the applicator tip 49 around the areas of the object that are to receive a layer of fluid. In this example, the object 71 is not usually moved during the application of the fluid layer by the applicator tip 49.

Figure 12:
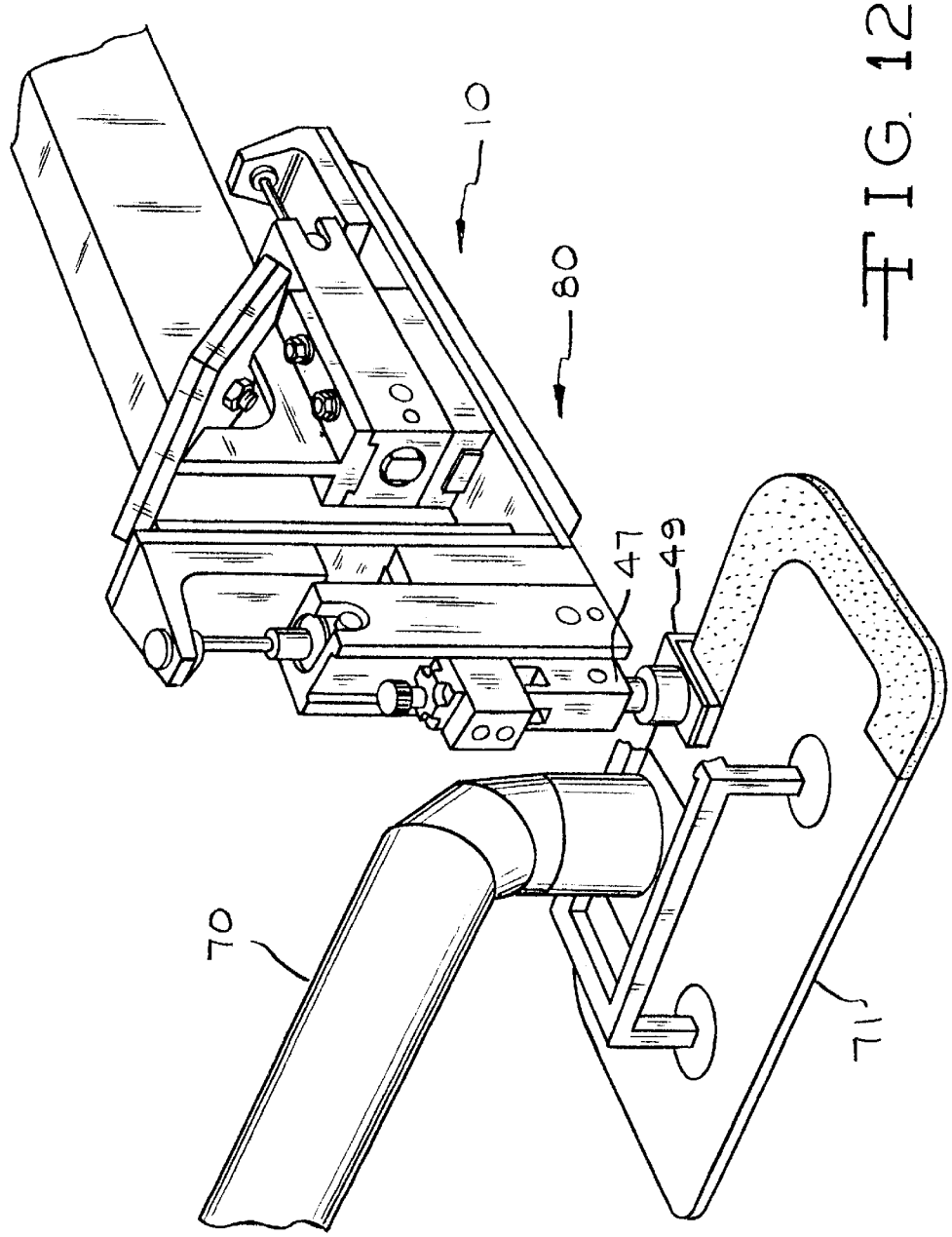
FIG. 12 is a partial perspective view of the automated system applying a fluid layer to an object.
Figure 13:
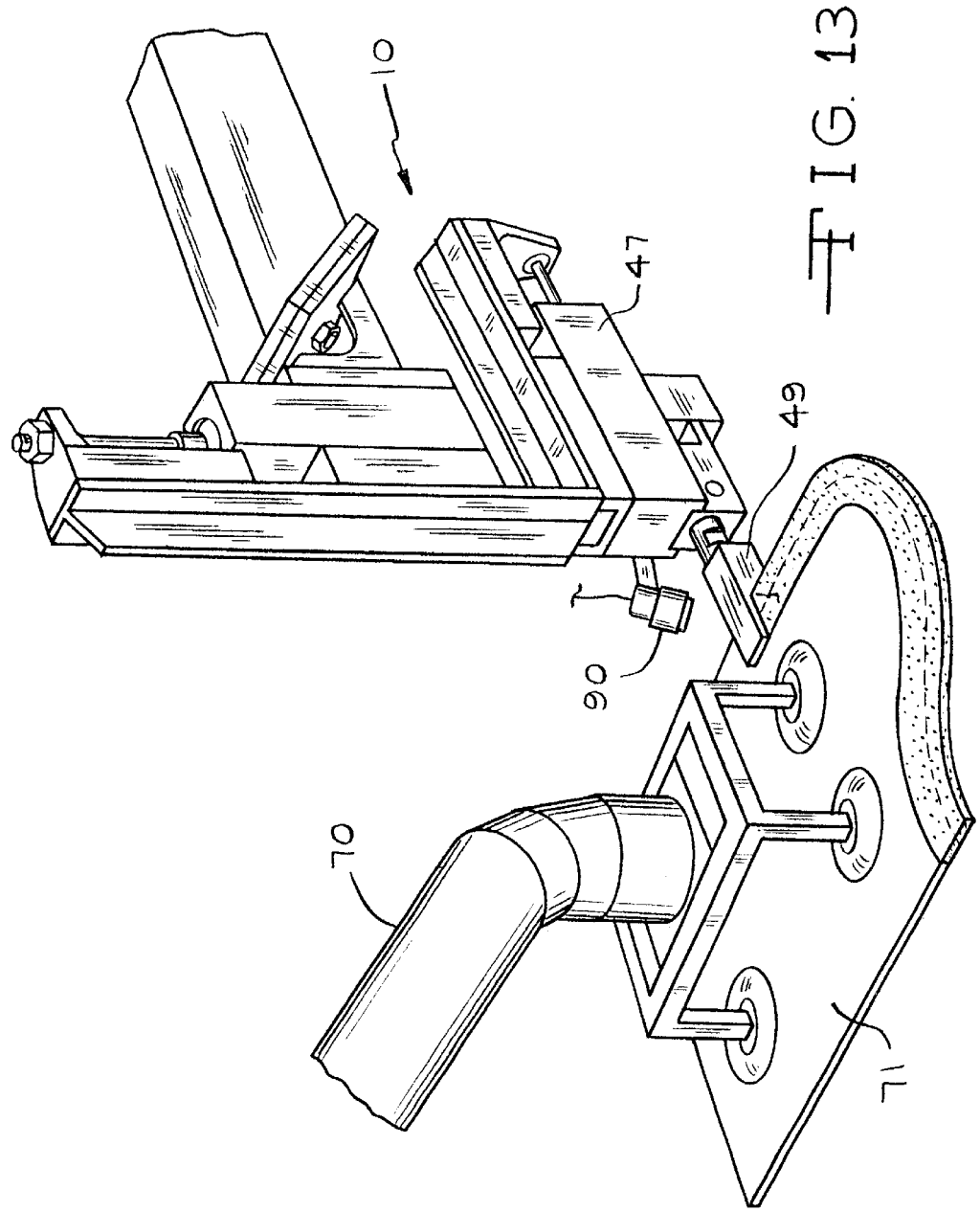
FIG. 13 is a partial perspective view of the automated system applying a fluid layer to an object.
Figure 14:
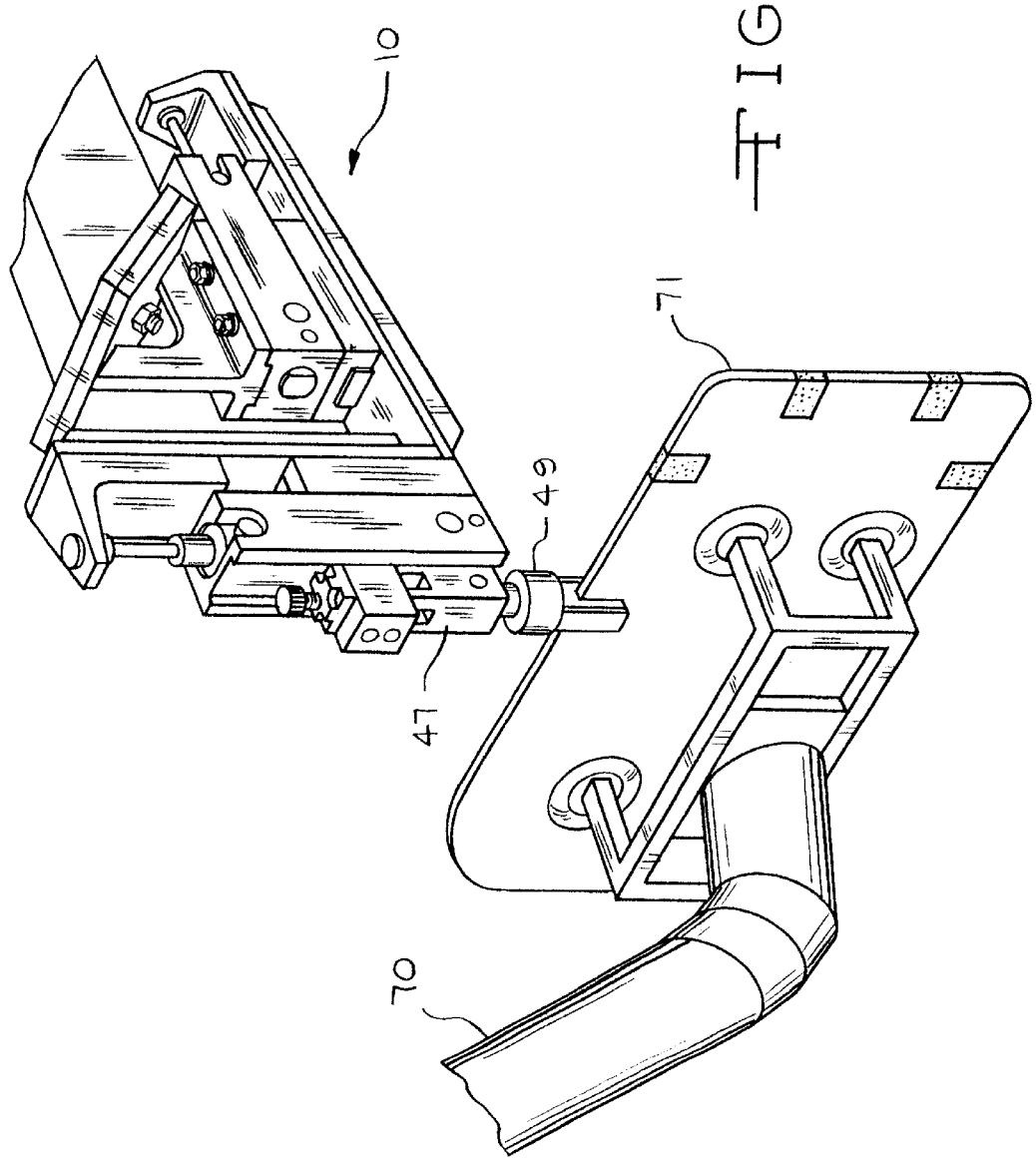
FIG. 14 is a partial perspective view of the automated system applying a fluid layer to an object.

The compliance mechanism 10 previously described can be utilized on an automated system 80 for applying fluid to an object as shown in FIGS. 11–18. In this application, the compliance mechanism 10, fluid dispenser 47 and fluid applicator tip 49 are positioned on a movable arm 81. The movable arm 81 is used to move the fluid dispenser 47 into position so that it is adjacent the object 71 on which the fluid is to be applied. The object 71 can be moved to the desired position for fluid application by the use of a robot or other suitable positioning means. As shown in FIGS. 12–14, the compliance mechanism 10 can be positioned so that the applicator tip 49 is in either a vertical or horizontal position for applying fluid to the object 71 as previously described.

The compliance mechanism 10 is an essential feature that allows the automated system 80 to properly interact with the object 71 that is to be coated. The compliance mechanism 10 provides the light touch and range of movement for the fluid dispenser 47 and applicator tip 49 to keep the applicator tip 49 in contact with the surface of the object that is to be coated. All of the previously described advantages of the compliance mechanism 10 are desirable features for the proper operation of the automated system.

The rotatable arm 81 is mounted on a rotatable shaft 87 that is disposed substantially perpendicular to the rotatable arm 81. It should be understood that more than one rotatable arm 81 can be mounted on the rotatable shaft 87. In practice, it has been found desirable to have two rotatable arms mounted on the rotatable shaft 87. The two rotatable arms 81 are usually positioned 90° apart although other orientations can be used for the rotatable arms. The fluid dispenser 47 and applicator tip 49 that are positioned on each rotatable arm 81 can be used to dispense different materials. An example would be clear and black primers that are components of a two-part priming system. The different materials can be applied consecutively or with a time delay between the application of each component. It is also possible for different dispensing equipment to be positioned on the rotatable arms so that other materials such as adhesives, abrasives, mastic bonding materials, masking liquids, cleaning compounds, lubricants, etc. can be applied to an object if desired. As shown in FIG. 13, one or more sensors 90 can also be positioned on the rotatable arms 81 or the fluid dispenser 47 to monitor the position, thickness, uniformity and quality of the material that is applied to the object 71. The sensors allow the continuous monitoring of the coating operation. If desired, signaling devices or alarms can be incorporated into the monitors to alert an operator if there are difficulties in the coating operation. The monitors can also be designed to stop the coating operation if the problems exceed set parameters for a particular coating operation.

Figure 18:
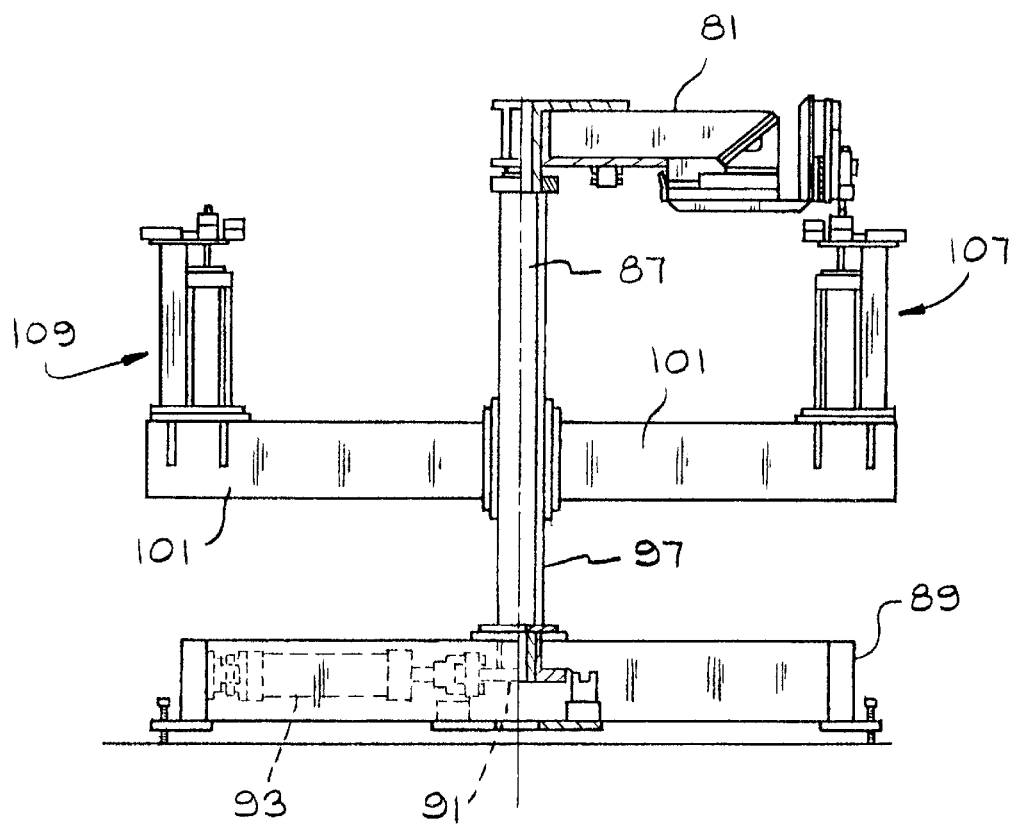
FIG. 18 is a front elevation and partial cross sectional view of the automated system of the invention.

As shown in FIG. 18, the rotatable shaft 87 is rotatably secured to a base 89 that supports the rotatable shaft. The end of the rotatable shaft 87 that is rotatably positioned in the base 89 is connected to a bell crank mechanism 91 which is used to rotate the rotatable shaft 87. A fluid actuated cylinder 93 is connected to the bell crank mechanism 91 and the advancement of the fluid actuated cylinder 93 operates the bell crank mechanism to rotate the rotatable shaft 87. It should be understood that other mechanisms can be used to rotate the rotatable shaft 87.

A structural column 97 is positioned around the rotatable shaft 87 and the column extends from the base 89 to the rotatable arm 81. The column 97 is secured to the base 89 so that the column does not rotate when the rotatable shaft 87 is caused to rotate. A beam 101 is slidably positioned on the column 97 so that the beam can be located between the base 89 and the rotatable arm 81. A suitable securement means (not shown) is utilized to secure the beam 101 to the desired position on the column 97. The beam 101 is usually disposed so that it is substantially parallel to the rotatable arm 81. The beam 101 also extends from each side of the column 97. Positioned on one end of the beam 101 is a fluid applicator tip removal station 107 and a fluid applicator tip replacement station 109. On the other end of the beam 101 is another fluid applicator tip removal station 107 and a fluid applicator tip replacement station 109. The details of the removal station 107 and the replacement station 109 will be discussed below. The fluid applicator tip removal and replacement stations are disposed on the beam 101 adjacent the plane of motion of the rotatable arm 81. The beam 101 can be advanced along the column 97 to position the fluid applicator tip removal and replacement stations in the desired location.

Figure 15:
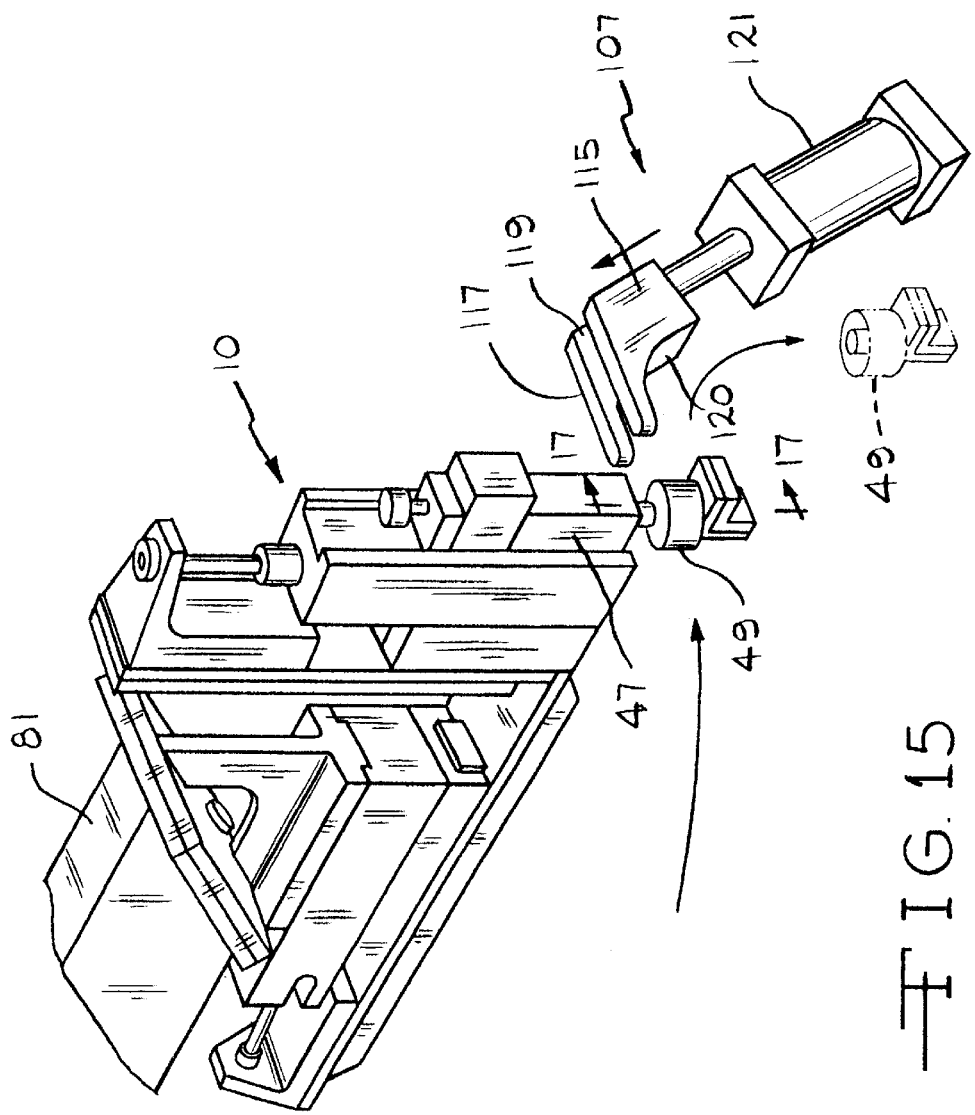
FIG. 15 is a partial perspective view of the applicator tip removal section of the automated system.

As shown in FIG. 15, the fluid tip removal station 107 has a stripper bracket 115 that contains a U-shaped portion 117 that defines a slot 119. The stripper bracket defines an arcuate surface 120 that is located on the portion of the bracket that engages the applicator tip. The stripper bracket 115 is mounted on a fluid actuated cylinder 121 that is used to move the stripper bracket 115 from an inactive position to an engagement position. In the engagement position the slot 119 of the U-shaped portion 117 is positioned to engage the fluid actuator tip 49 located on a fluid dispenser 47 that is mounted on the compliance mechanism 10 that is positioned on the rotatable arm 81. When the stripper bracket 115 is in the engagement position, the fluid applicator tip 49 is positioned in the slot by the rotation of the rotatable arm 81. As the rotatable arm 81 continues to rotate the arcuate surface 120 on the stripper bracket 115 causes the applicator tip to advance away from the fluid dispenser 47 and removes the fluid applicator tip 49 from the fluid dispenser 47. In this manner the fluid applicator tip 49 is removed from the fluid dispenser 47 and falls into a receptacle (not shown) for used applicator tips.

Figure 16:
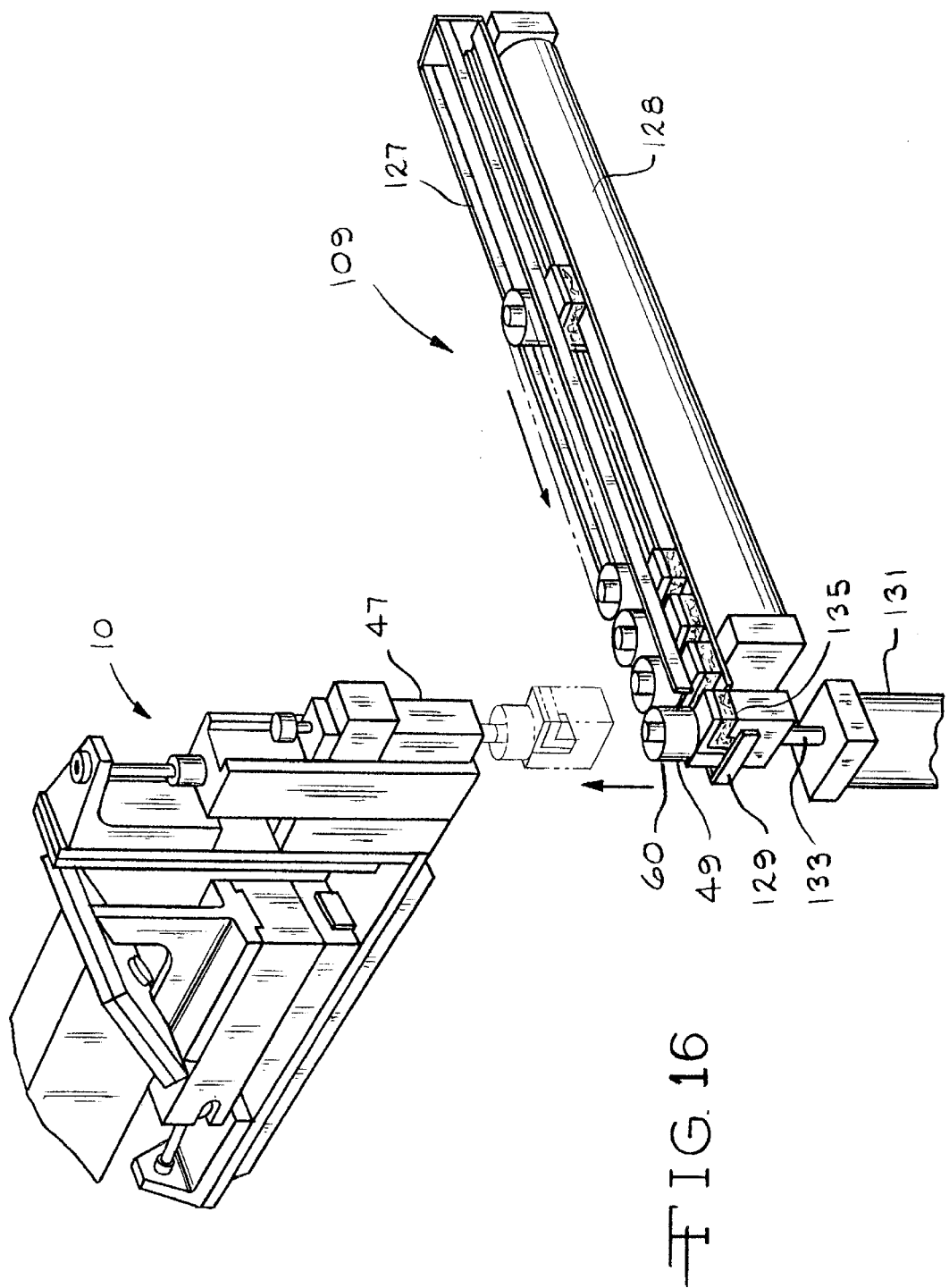
FIG. 16 is a partial perspective view of the applicator tip replacement section of the automated system.
Figure 19:
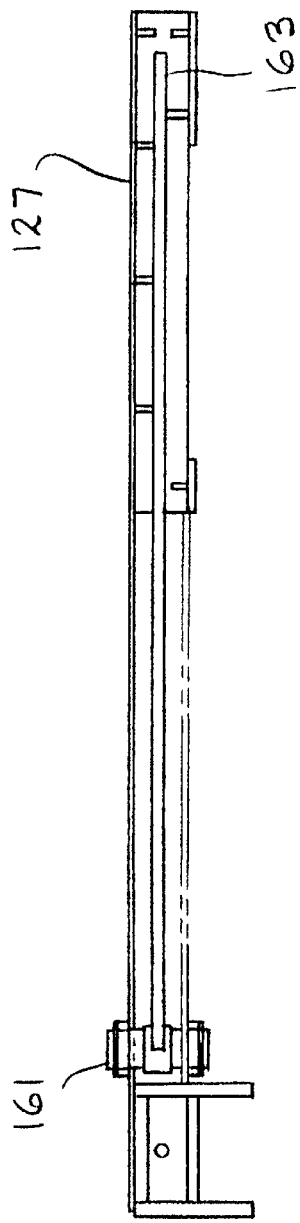
FIG. 19 is a partial side elevation view of another feature of the invention.
Figure 20:
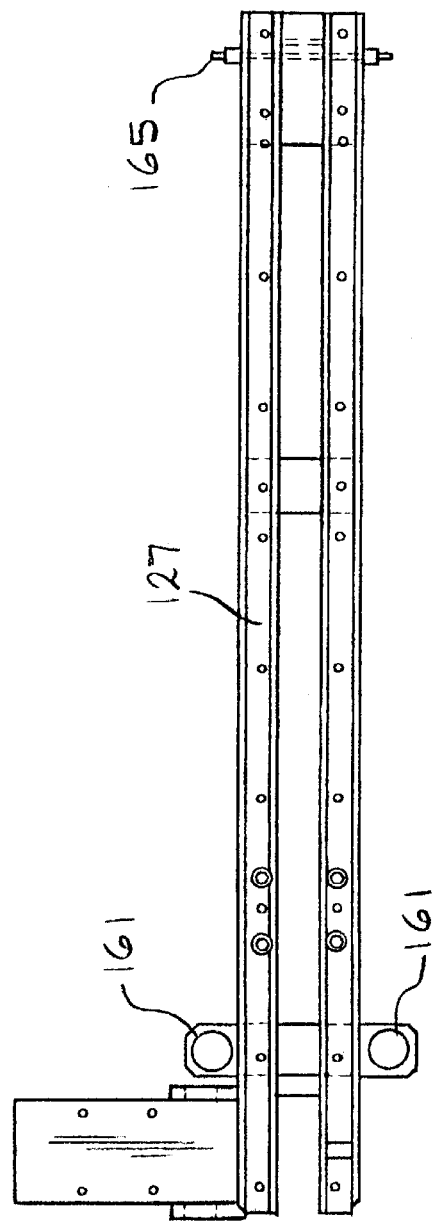
FIG. 20 is a partial plan view of another feature of the invention.
Figure 24:
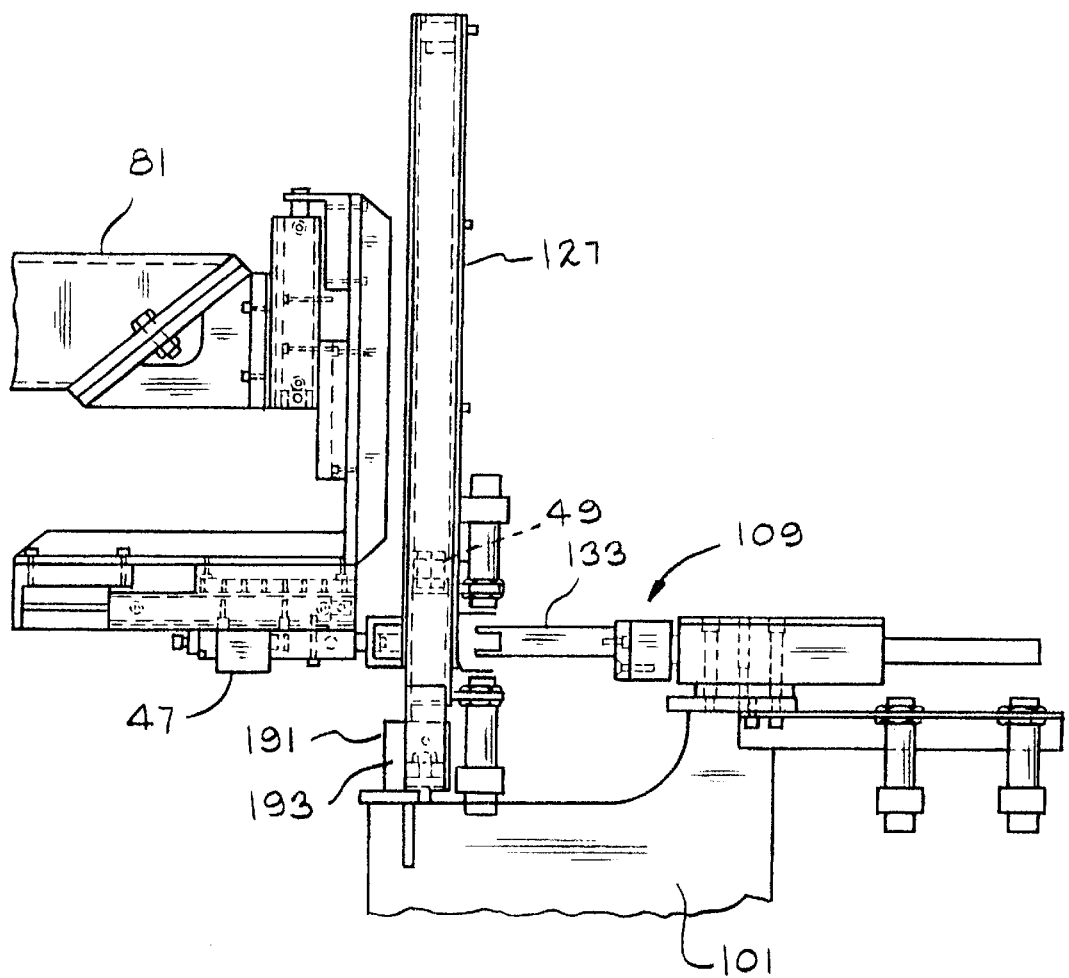
FIG. 24 is a side elevation view of another feature of the tip replacement station.

As shown in FIG. 16, the fluid applicator tip replacement station 109 has a rack 127 where a plurality of fluid applicator tips are positioned. The rack 127 is disposed so that the fluid applicator tips are forced by a rodless cylinder 128 to the first end 129 of the rack 127. The rack 127 is positioned in a generally horizontal position to supply applicator tips 49 when the fluid dispenser 47 is in a vertical orientation as shown in FIG. 16. However, it should be understood that other means such as gravity or vibration action can be used to advance the applicator tips in the rack 127. FIGS. 19 and 20 show another mechanism to advance the applicator tips 49 along the rack 127 to the tip replacement position. In this embodiment a coiled spring 161 is positioned on each side of the rack 127 adjacent the end where the applicator tips 49 are replaced in the fluid dispenser 47. The coiled spring 161 has an end 163 that is advanced from the coiled spring and engages a moveable pusher 165. The moveable pusher 165 is designed to fit in the rack 127 and to advance the applicator tips 49 due to the force placed on the moveable pusher by the coiled springs 161. The coiled springs are designed to have a substantially uniform retraction force over the designed length for the coiled spring. FIG. 24 shows another mechanism to supply applicator tips 49 to the tip replacement station 109. In this mechanism, the rack 127 is positioned in a vertical orientation and the applicator tips 49 are fed to the tip replacement station by gravity. The rack 127 is positioned in this generally vertical position to supply applicator tips 49 when the fluid dispenser 47 is in a horizontal orientation as shown in FIG. 20. An escapement mechanism (not shown) can be positioned in the end of the rack 127 to ensure that only one applicator tip is positioned at the end of the rack. A gate type of mechanism or other device can be used as the escapement mechanism. It is also possible to use a magazine type of storage device for the applicator tips instead of the rack 127. Again, an escapement mechanism can be used with the magazine type of storage system to ensure that only one applicator tip is present at the replacement area. Positioned beneath the first end 129 of the rack 127 is a fluid operated cylinder 131. The fluid operated cylinder 131 has a rod 133 that extends from the cylinder 131 in a direction towards the rack 127. The rod 133 has an end 135 that is configured to engage the applicator tips so that the applicator tips can be advanced without damaging the applicator tips.

In practice, it has been found desirable to provide the applicator tips 49 with a configuration that has a consistent uniform shape that can interact with the end 135 of the rod 133. As shown in FIG. 16, the applicator tip 49 has a cylindrical cap section 60 that is disposed to properly engage the end 135 of the rod 133. If all the applicator tips that are used with the automated system 80 contain this cap section 60 this provides a uniform surface that can be engaged in the tip replacement station 109. In addition, the cap section 60 is also disposed to provide a uniform surface for engagement with the arcuate surface 120 of the tip removal station 107 to facilitate applicator tip removal.

Activation of the fluid operated cylinder 131 causes the rod to advance with respect to the cylinder. The first end 129 of the rack 127 is disposed to be positioned immediately adjacent a fluid dispenser 47 that does not contain a fluid applicator tip. When the fluid dispenser 47 is so positioned with regard to the rack 127, the fluid operated cylinder 131 can be activated so that the rod 133 is advanced and pushes a fluid applicator tip 49 from the rack 127 into engagement with the fluid dispenser 47 whereby a new fluid applicator tip 49 is positioned on fluid dispenser 47.

Figure 17:
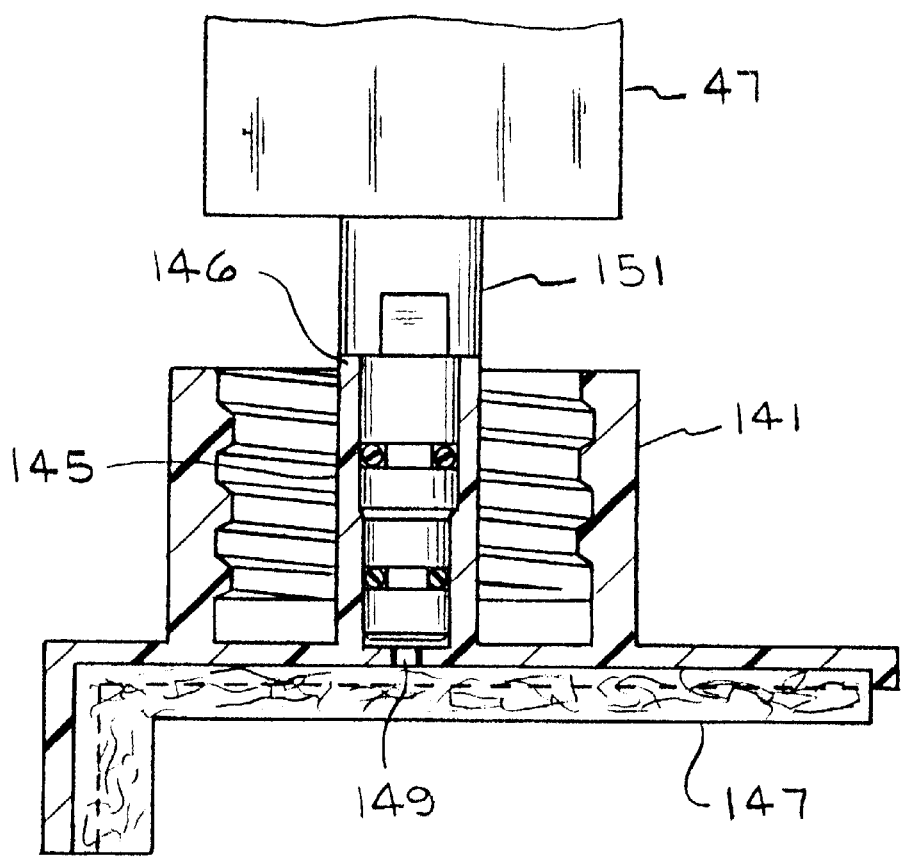
FIG. 17 is a cross sectional view taken along line 17—17 in FIG. 15 showing the applicator tip being inserted into the fluid dispenser
Figure 21:
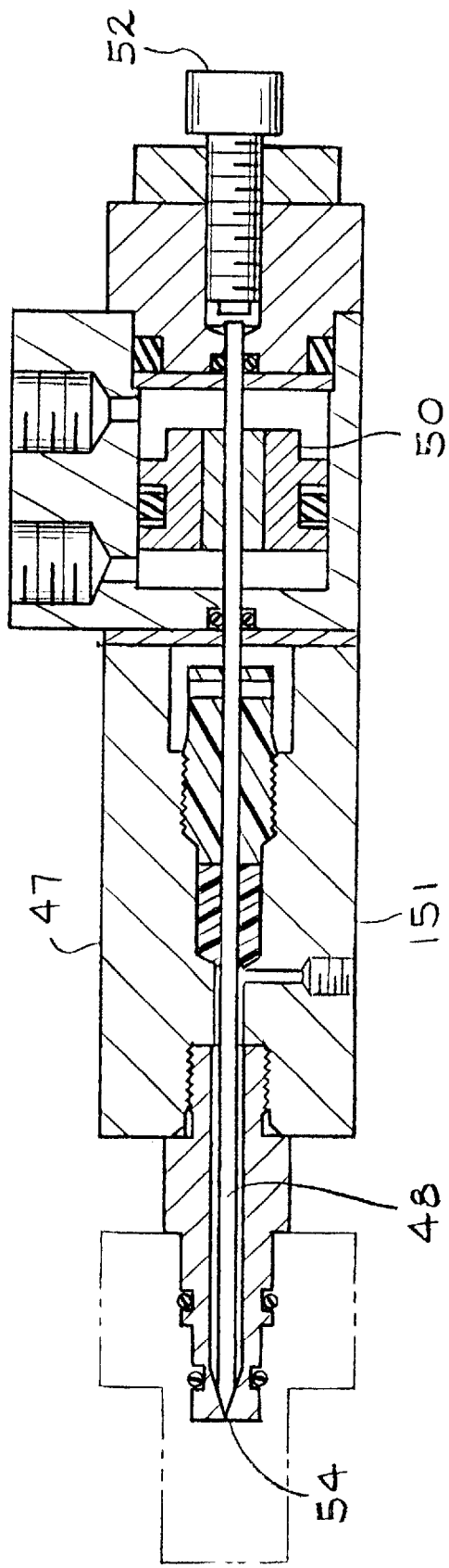
FIG. 21 is a cross sectional view of the fluid dispenser.

FIG. 17 shows an applicator tip 141 being positioned on a fluid dispenser 47. The applicator tip 141 has a passageway 145 that is in communication with a felt or foam pad 147 that is used to apply fluid to an object. The passageway 145 has a shoulder 146 and terminates in an aperture 149 that is in communication with the pad 147. The fluid dispenser 47 has a hollow shaft 151 that extends from the fluid dispenser and into the passageway 145. As shown in FIG. 21, a needle valve 48 is positioned in the hollow shaft 151. The needle valve 48 can be moved to control the flow of fluid through the fluid dispenser 47. The applicator tip 141 is properly positioned on the fluid dispenser 47 when the hollow shaft 151 is in contact with the shoulder 146 in the passageway 145. The shaft 151 and passageway 145 are designed so that there is a snug fit between these two components. A sealing mechanism 153 such as an O-ring can be positioned on the shaft 151 to ensure that there is a seal between the passageway 145 and the shaft 151.

As shown in FIG. 18, the tip replacement station 109 and tip removal station 107 are normally mounted on the beam 101 so that they function with an applicator tip 49 that is positioned at a pre-selected orientation. Usually the applicator tip is positioned in a vertical or horizontal orientation and the tip removal station 107 and tip replacement station 109 are mounted on the beam 101 to properly interact with the pre-selected position for the applicator tips. If it is necessary to change the position or orientation for the applicator tips 49 for a particular fluid application, a rotary actuator 69, as shown in FIGS. 9 and 25, can be used to move the applicator to the desired orientation for interaction with the tip removal station 107 and the tip replacement station 109. The rotary actuator 69 can be programmed to rotate the fluid dispenser 47 to the desired orientation to allow the applicator tip 49 to properly interface with the removal station 107 and replacement station 109 whenever the removal station is activated. In this operation, the applicator tip 49 would always be in the proper location regardless of the orientation of the applicator tip during the application of fluid to the object 71. It is also possible to position the tip removal station 107 and tip replacement station 109 on the beam 101 so that the positioning of these stations can be changed to properly interface with applicator tips that are positioned at different orientations. In fact, a device similar to the rotary actuator 69 could be utilized to change the position of the tip removal and tip replacement stations so that these stations properly interface with the applicator tips 49.

As shown in FIG. 24, a docking station 191 can be positioned on the beam 101 at a location that can interface with the applicator tips 49 when the applicator tips are not being used to apply fluid to the object 71. The docking station 191 can function to keep contamination from coming into contact with the applicator tips 49 when the applicator tips are not being used for coating purposes. It is important to keep dirt, high humidity air and other impurities from coming into contact with the applicator tips. The docking station 191 includes a reservoir 193 that is positioned immediately adjacent the applicator tip 49 when the applicator tip has been moved by the rotatable arm 81 to a position where the applicator tip does not apply fluid to the object 71. A solvent can be present in the reservoir 193 of the docking station to keep the applicator tips in condition for applying fluid. The solvent can migrate from the reservoir 193 to interact with the applicator tip 49. For most applications, the fluid dispenser will be orientated at the docking station so that the applicator tip 49 extends towards and is immediately over the reservoir 193 so that the applicator tip essentially closes the reservoir. When the applicator tip is not at the docking station, a cover can be placed over the reservoir 193 to retain the solvent in the reservoir. The solvent can also function to keep the fluid in the applicator tips from changing condition so that the fluid remains in a condition or state that is suitable for coating the object 71.

In operation, the automated system 80 is positioned as shown in FIGS. 12–14 to apply fluid through a fluid applicator tip mounted on a fluid dispenser to an object 71. As shown in these figures, various applicator tips are being utilized to apply a fluid to an object 71 that is being supported and moved by a robot 70. As can be seen in these figures, there are many different applicator tip and fluid deposit patterns that can be used with this invention. When it is desirable to replace the fluid applicator tip 49, the rotatable arm 81 mounted on rotatable shaft 87 is caused to rotate so that the fluid dispenser 47 is positioned at the tip removal station 107, as shown in FIG. 15. The rotatable arm 81 is caused to move in this direction through the actuation of fluid actuated cylinder 83 which is connected to the bell crank mechanism 91 that is mounted on the rotatable shaft 87 that supports the rotatable arm 81. As the rotatable arm 81 moves toward the tip removal station 107, fluid actuated cylinder 121 is actuated to bring the U-shaped portion 117 of the stripper bracket 115 into alignment with the fluid applicator tip 49. In this position the slot 119 of the U-shaped portion 117 is disposed to extend between the fluid applicator tip 49 and the fluid dispenser 47. Rotation of the fluid applicator tip 49 and fluid dispenser 47 by the rotatable arm 81 results in the slot 119 and the arcuate surface 120 engaging and removing the fluid applicator tip 49 from the dispenser 47. The arcuate surface 120 causes the applicator tip 49 to advance away from the fluid dispenser 47 as the applicator tip moves along the arcuate surface. Eventually, the applicator tip 49 is removed from the fluid dispenser 47 by this motion. The fluid applicator tip 49 that is removed from the fluid dispenser 47 is allowed to fall into a receptacle (not shown) positioned beneath the fluid dispenser 47. The rotatable arm 81 continues rotation to a home position to reload a new applicator tip.

When the fluid dispenser 47 is positioned in the tip replacement station 109, as shown in FIG. 16, above the first end 129 of the rack 127 fluid operated cylinder 131 is actuated to advance configured end 135 of the rod 133 in a direction toward the fluid dispenser 47. The advancing rod 133 engages a fluid applicator tip 49 positioned at the first end 129 of the rack 127 and causes the fluid applicator tip 49 to advance toward the fluid dispenser 47. The rod 133 is advanced until the fluid applicator tip 49 is securely received by the fluid dispenser 47. Once the fluid applicator tip 49 is secured to the fluid dispenser 47 the rod 133 is advanced in a direction away from the fluid dispenser 47 and the rotatable arm 81 is free to rotate away from the tip replacement station 109 on programmed command. The rod 133 is advanced in a direction toward the fluid operated cylinder 131 the replacement tips in the rack 127 are caused to advance by a pusher, by the force of gravity or by another mechanism until another replacement tip is located at the first end 129 of the rack 127 within the escapement mechanism. As previously described, a rotary actuator 69, as shown in FIG. 8 can be used to position the fluid dispenser 47 in the proper orientation to interact with the tip removal station 107 and the tip replacement station 109. With a new fluid applicator tip 49 in the fluid dispenser 47, the rotatable arm 81 can be moved by programmed command to a position where the fluid applicator tip can apply a layer of fluid to the object 71.

The tip removal operation takes place very quickly as the fluid dispenser 47 is advanced by the rotatable arm 81. A new applicator tip 47 can be inserted very quickly by the operation of the tip replacement station 109. Thus, removal and replacement of an applicator tip 49 can be accomplished without significantly impacting the application of fluid on an object.

During the application of the fluid, the supply of fluid to the applicator tip can be controlled to prevent too much or too little fluid being applied to the object. As shown in FIG. 21, the fluid dispenser 47 has a needle valve 48 that can control very precisely the flow of fluid through the fluid dispenser 47 being dependant on the position of the needle valve and the pressure of the fluid supplied to the needle valve. A fluid operated cylinder 50 is connected to the needle valve 48 to move the needle valve. The cylinder 50 is used to move the needle valve to open and close the fluid dispenser 47. An adjustment screw 52 is positioned at one end of the fluid dispenser 47 to control the position of the needle valve 48 in the open position. Movement of the adjustment screw 52 changes how far the needle valve 48 will move when the needle valve is acted upon by the cylinder to open the needle valve. Such movement or adjustment of the needle valve changes the size of the orifice 54 in the fluid dispenser 47. Being able to vary the size of the orifice 54 allows the fluid dispenser 47 to accommodate coating fluids of varying viscosity and rheology and still properly interface with the fluid supplied under pressure to the fluid dispenser. The needle valve 48 provides a very effective means for controlling the amount of fluid that is supplied to the applicator tip 49 on the fluid dispenser 47. The needle valve 48 can meter a very precise quantity of coating fluid to the applicator tip 49. The needle valve 48 also provides a very positive open and closed control for the fluid that is supplied to the applicator tip. In some applications, such as a corner on an object, it may be necessary to open and close the needle valve very quickly to ensure that the proper quantity of fluid is supplied to the applicator tip 49 to properly coat the surface of the object. The needle valve 48 also provides very quick and precise supply and shut off of the coating fluid at the start and completion of the coating operation.

Figure 22:
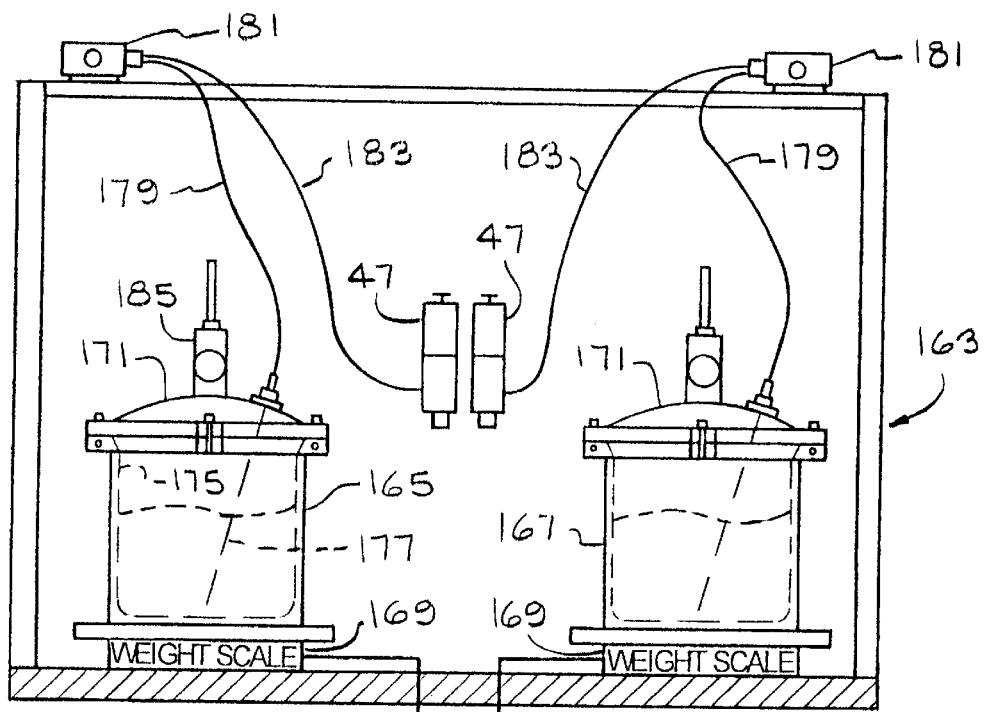
FIG. 22 is a front elevation view of a fluid supply system of the invention.
Figure 23:
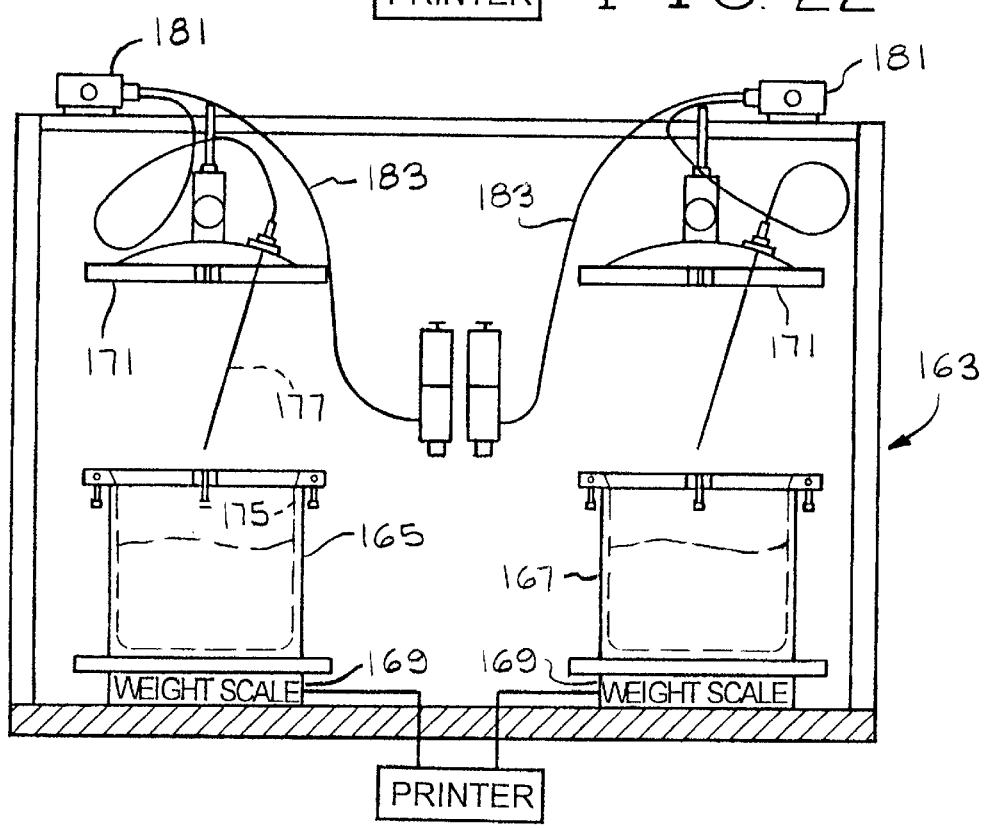
FIG. 23 is a front elevation view of a fluid supply system.

FIGS. 22 and 23 show a fluid supply system 163 that can be used to supply fluid to a fluid dispenser 47. The fluid supply system 163 has a first pressurizable container 165 and a second pressurizable container 167. A weight scale 169 can be positioned beneath the first and second containers. A lid 171 is positioned on the first and second containers 165, 167. The first container 165 contains a first fluid that is to be applied to an object and the second container 167 contains the same or a different fluid than the first container. A plastic liner 175 can be positioned in the first and second containers to hold the appropriate fluids. The plastic liner 175 can be a disposable product and acts to separate the fluid that is to be applied to an object from the interior surface of the first and second containers.

The fluid supply system 163 is used to provide a very controlled and metered supply of fluid to the applicator tip 49 on the fluid dispenser 47. The supply of fluid is also recordable in a precision manner. Each metering pump 181 is designed to provide a very specific and controllable volume of fluid to the fluid dispenser 47. The metering pumps have a variable precision speed control, which is directly related to the positive volume output of the metering pumps. Therefore, the metering pump 181 allows for a very accurate calculation to be made on the precise amount of fluid that is supplied to the fluid dispenser and therefore to the object. The fluid output of the fluid dispenser 47 must be precisely controlled to match the velocity or surface speed of the object 71 that is passed over the applicator tip 49 during the coating operation. The surface speed of the object will usually vary as corners and curves are encountered on the moving object. To precisely match the fluid supplied to the applicator tip 49 with the surface speed of the object 71, a sequential activation of the metering pump 181 and the closing of the needle valve 48 in the fluid dispenser 47 is utilized to control the flow of fluid to the applicator tip 49 to achieve the desired application of fluid to the object. The adjustable needle valve 48 with rapid open and close capabilities works in unison with the sequential operation of the metering pump to provide a precision supply of fluid to the applicator tip 49 to coat the object in the desired manner.

In practice, it has been found desirable to have applicator tips 49 that have good fluid retention properties so that the fluid is maintained in the applicator tip when the metering pump 181 and needle valve 48 in the fluid dispenser 47 are cycled to the off or closed positions. If the applicator tip does not have good fluid retention properties, the fluid will continue to flow from the applicator tip and fluid will be deposited in too thick of a layer or in the wrong locations on the object 71. It has also been found desirable for the applicator tips 49 to have a shape that holds only a small volume of fluid. The small volume of fluid makes it easier to control the flow of fluid from the applicator tip.

A dip tube 177 extends through the lid 171 and into the interior of the first and second containers. The dip tube 177 is provided to remove the fluid from the first and second containers. The dip tube is connected to one end of a tube 179 and the other end of the tube is connected to a metering pump 181. Each metering pump 181 is connected by a hose 183 to a fluid dispenser 47 that is mounted on a rotatable arm 81 as previously described. The lid 171 has a pressure port 185 that is used to supply a gas under low pressure to the first and second containers. The gas is supplied at a pressure from about 0.2 psi about 5 psi. The gas acts to feed, at a low pressure, the fluid in the first and second containers to the metering pumps 181. Usually, the gas is a dry inert gas such as nitrogen. The nitrogen gas forms a protective, moisture resistant barrier over the fluid in the first and second containers. A source of air under pressure (not shown) is also connected to the fluid dispenser 47 to actuate the needle valve in the fluid dispenser 47.

In operation, the fluid that is to be supplied to the fluid dispensers 47 for coating an object is positioned in the first and second containers 165, 167. The fluid is positioned in the plastic liners that are positioned in the first and second containers. The lid 171 is secured to each container so that the dip tube 177 extends into the fluid in the containers. A gas under pressure is then supplied to the pressure port 185 to place the fluid in the container under pressure. The gas under pressure forces the fluid into the dip tube 177, through the tube 179 and to the metering pump 181. The metering pump 181 then supplies the fluid through hose 183 to a fluid dispenser 47. The fluid dispenser 47 dispenses the fluid in the manner previously described.

The first and second container 165, 167 can be sized so that the quantity of fluid that they hold is correlated to a defined operating period for the coating equipment. Usually, a single shift of a shift is selected so that there will be as little waste of coating fluid as possible. The plastic liners 175 are usually disposable so that they can be removed and disposed of along with an unused coating fluid. The plastic liners 175 greatly simplify clean up of the first and second containers. A cleaning fluid can also be provided to flush any coating fluid from the dip tube 177, tube 179, metering pump 181, hose 183 and fluid dispenser 47 to assist in cleaning the coating apparatus if the coating apparatus is not going to be used for an extended time.

The automated system provides a very flexible and adaptable machine for dispensing and laydown of reactive liquids, adhesives, primers and other materials. When the automated system is used with a robot to advance the object to be coated, the automated system is particularly useful for applying a fluid to several different objects. When a particular product has reached its production goal, the system, including the robot, can be programmed for the next object to be coated. The program parameters for any particular object can be stored to memory and recalled anytime that it is desirable to again process that particular object. This flexible and simple job changeover increases the usefulness of the automated system and creates maximum utilization of the system. It also allows the priming module to have a practically perpetual life as the automated system can be used with virtually any product that falls within the physical size limitations of the automated system and the robot.

FIG. 25 shows an alternative arrangement for docking stations, tip removal and tip insertion. The compliance mechanism 10, fluid dispenser 47 and applicator tip 49 are positioned on rotatable arm 81 that are rotatably secured to post 87 as previously described. The post 87 and arms 81 are supported by a base 89. An arm 102 extends from each side of the post 87. The arms 102 extend in substantially opposed directions from the post. Only one arm 102 is shown in detail for clarity in the drawings. However, the opposite side of the fluid application system 80 is a mirror image of the side that is shown in detail. The device of this figure is used to apply a fluid layer to an object as previously described.

A docking station 191 substantially as shown in FIG. 24 is slidably positioned on the arm 102. A fluid operated cylinder 192 can be operatively connected to the docking station to move the docking station into a desired position with respect to the applicator tip 49 on the fluid dispenser 47 when it is desirable to place the applicator tip in a protective environment that keeps the applicator tip 49 in condition for future application of fluid to an object. A tip replacement station 109 that is substantially similar to the device shown in FIG. 16 is also slidably positioned on the arm 102. A tip removal station 107 is connected to the tip replacement station 109 by bracket 108 so that the tip removal station moves with the tip replacement station along the arm 102. The tip replacement station 109, tip removal station 107 and the docking station 191 are operatively connected so that they move in unison along the arm 102. A fluid operated rodless cylinder (not shown) is positioned in the arm 102 and is connected to the tip replacement station 109 for moving the docking station 191, tip removal station 107 and tip replacement station 109 along the arm 102. The tip removal station 107 has a stripper bracket 115 previously described with respect to the tip removal station described in FIG. 15. The stripper bracket 115 is moved into an engagement position with respect to an applicator tip 49 when the tip replacement station 109 is advanced along the arm 102 to be in position to supply replacement fluid applicator tips 49 to the fluid dispenser 47. The docking station 109, the tip removal station 107, and the tip replacement station 109 all function substantially in the same manner as previously described.

In operation, if it is desired to replace an applicator tip 49, the arm 81 on which the applicator tip 49 and fluid dispenser 47 are operatively connected is rotated in a direction toward one of the tip removal stations 107. The fluid operated rodless cylinder in the arm 102 is activated to bring the stripper bracket 115 into a position where the stripper bracket is in the path of travel of the applicator tip 49. As the applicator tip 49 is advanced by the rotating arm 81, the stripper bracket 115 engages the applicator tip 49 and removes it from the fluid dispenser 47 in the manner previously described. The rodless cylinder also moves the tip replacement station 109 into alignment with the fluid dispenser 47 from which the stripper bracket 115 has just removed the applicator tip. When the fluid dispenser 47 is in alignment with the tip replacement station 109 by the linear transfer along arm 102, the tip replacement station can be activated to insert a new applicator tip in the fluid dispenser 47 in the manner as previously described. As the docking station 191 is operatively connected to the tip replacement station 109, the docking station is moved out of alignment with the fluid dispenser 47 during the tip replacement operation. Once the new applicator tip 49 has been positioned on the fluid dispenser 47, the fluid dispenser on this side of the fluid application system 80 is again available to apply fluid to an object. As there is a tip removal station 107 and tip replacement station 109 on each side, this function can be performed on both sides of the fluid application system 80. The rotary actuator that is positioned on each arm 81 can be used to rotate the fluid dispenser 47 to a position where the fluid dispenser is properly located to interact with the tip removal station 107 and the tip replacement station 109.

Once a new applicator tip 49 has been inserted onto the fluid dispenser 47, the rodless cylinder in arm 102 is activated to bring the docking station into alignment or position with respect to the applicator tip 49. The fluid operated cylinder 192 can be activated to position the docking station in the desired position with respect to the applicator tip 49.

An additional docking station 191 can be positioned on a support member 108 that extends from the base 89. The support member 108 is located substantially equidistant between the two arms 102 that extend from the post 87. A fluid operated cylinder 192 is positioned on the support member 108 and can be used to position the docking station 191 in the desired location with respect to the applicator tip 49. The docking stations 191 shown in this figure function substantially in the same manner as previously described. The docking stations 191 provide three separate locations where the, applicator tip 49 can be held in a protected environment when it is not being used to apply a fluid to an object. The docking stations 191 can also be moved by the activation of the fluid operated cylinders 192 which are effective to move the docking stations away from the applicator tip 49 so that the applicator tip can be used to apply fluid to the object.

Figure 26:
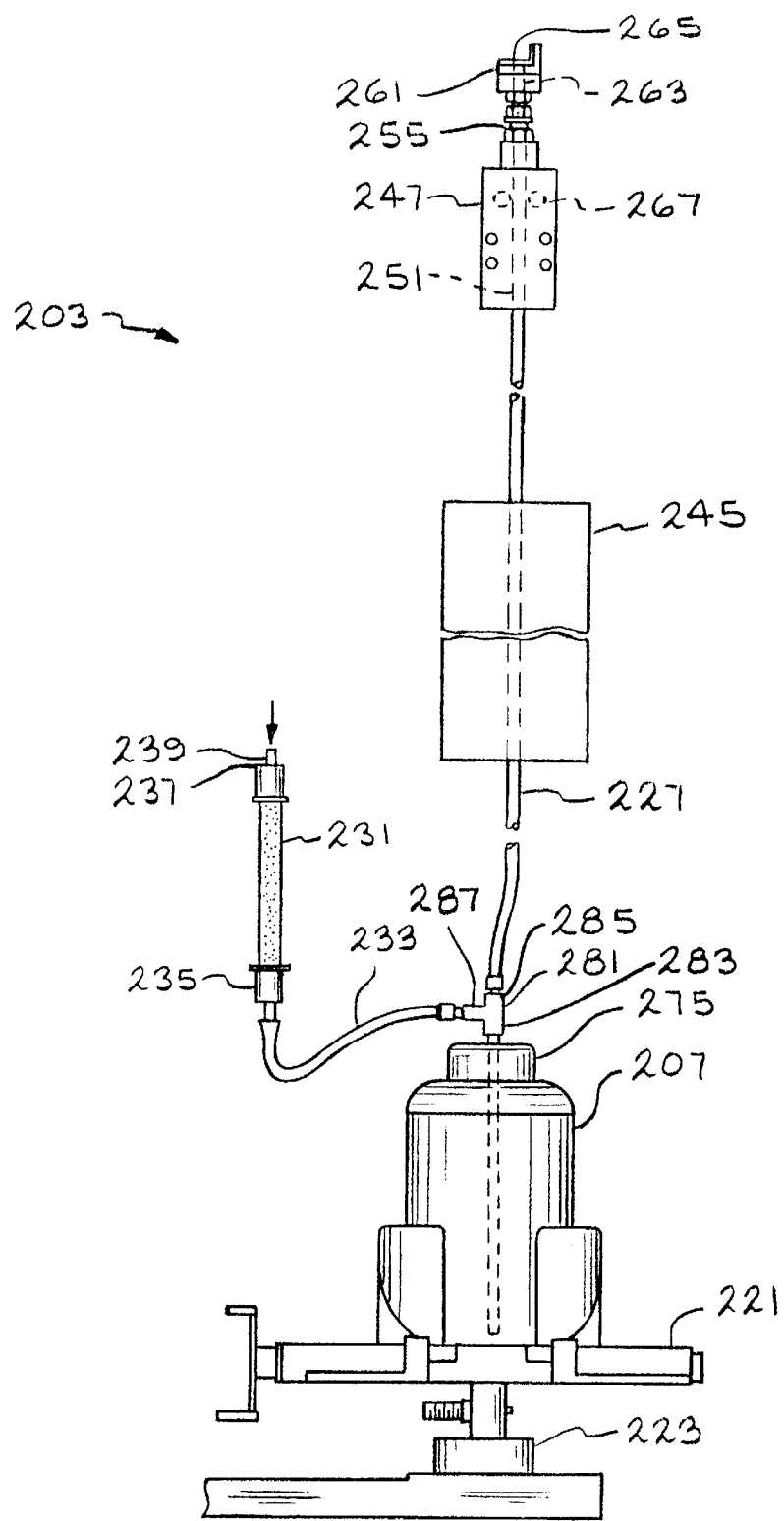
FIG. 26 is a front elevation view of another feature of the invention.
Figure 27:
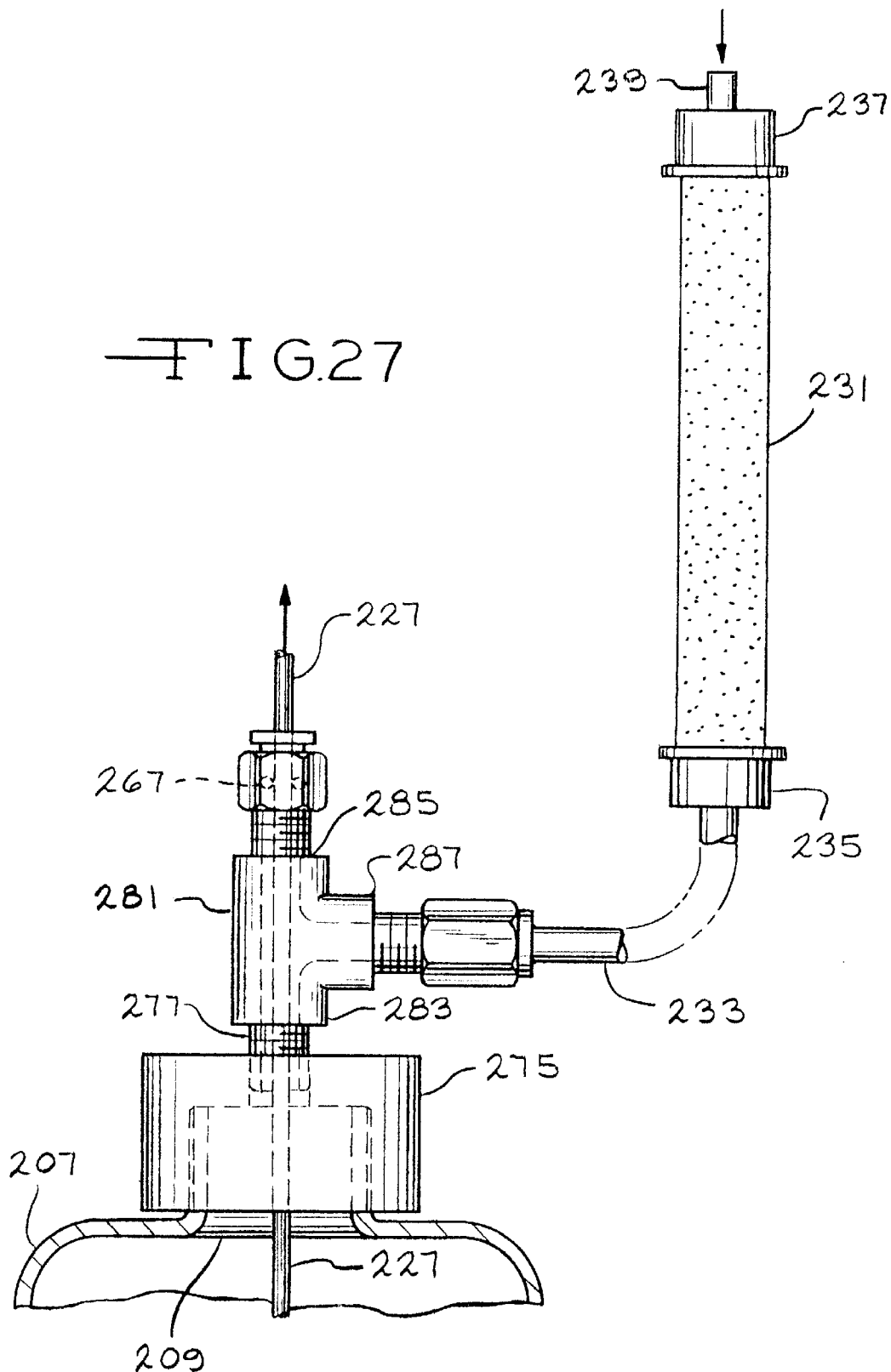
FIG. 27 is a partial enlarged front elevation view of the features show in FIG. 26.

FIGS. 26 and 27 show another fluid supply system 203 that can be used to supply fluid to an automated system for applying a fluid to an object. The fluid supply system 203 can be utilized with the automated system previously described in this patent application. However, to simplify the explanation only the components necessary for the fluid supply system will be described in detail.

The fluid supply system 203 includes a container 207 for the fluid. As shown in FIG. 27, the container has an opening 209 and a closure 275 is positioned on the opening 209 to effectively close the container. The closure 275 has a first threaded port 277 that extend through the closure 275 and is in communication with the interior of the container 207. The container 207 is releasably held in a securing device 221 that is mounted on a shaking mechanism 223.

A tee fitting 281 having a first opening 283, second opening 285 and third opening 287 is positioned on the closure 275 with the first opening 283 being secured to the port 277. A small diameter tube 227 extends through the second opening 285 in the Tee fitting 281, through the first opening 283 and through the port 277 into the interior of the container 207. The second opening 285 is secured around the small diameter tube 227 in a manner whereby atmospheric air cannot pass through the second opening into the interior of the Tee fitting 281 and into communication with the interior of the container 207. The first opening 283 and the port 277 are sized so that there is space around the small diameter tube 227 that extends into the container 207. A desiccant container 231 is operatively connected to the third opening 287 on the Tee fitting 281. Usually, the desiccant container 231 is connected to the third opening by a tube 233 that is connected to the first end 235 of the desiccant container 231. The tube 233 extends through the third opening and is in communication with the interior of the Tee fitting 281. The second end 237 of the desiccant container 231 has a closeable opening 239 that can be opened to the atmosphere. The third opening 287 is in communication with the interior of the Tee fitting and thus into fluid communication with the interior of the container 207. The third opening 287 is secured to the desiccant container 231 in a manner whereby air cannot pass through the third opening 287 into the interior of the container 207. The air from the atmosphere must pass through the desiccant container 231 to enter the interior of the Tee fitting 281 and thus into the interior of the container 207.

The small diameter tube 227 that extends from the second opening 285 in a direction away from the container 207 is operatively connected to a positive displacement pump 245. An example of a positive displacement pump that can be used is a peristaltic pump that engages the small diameter tube to positively advance material along the tube. The fluid is retained in the small diameter tube and the pump 245 acts upon the tube to advance the fluid. In the case of a peristaltic pump, the pump squeezes the tube to advance the fluid. It is important that the fluid not come into direct contact with the components for the pump 245. From the positive displacement pump 245, the small diameter tube 227 enters fluid dispenser 247. The fluid dispenser 247 defines a passageway 251 and a tip region 255. The passageway 251 extends through the fluid dispenser 247 and through the tip region 255. A fluid applicator tip 261 is usually positioned on the tip region of the fluid dispenser 247. The application tip 261 can have an applicator pad or a brush 265 that applies the fluid to the objects as is well known in the art. The fluid applicator tip 261 defines a cavity 263 that is in fluid communication with the passageway 251 that extends through the fluid dispenser 247 in the tip region 255. The cavity 263 is in direct communication with the applicator pad or brush 265. A tube lock 267 can be positioned in the passageway 251 in the fluid dispenser 247. The tube lock 267 allows the small diameter tube 227 to be inserted into the fluid dispenser 247 in a direction whereby the small diameter tube 227 can be advanced through the passageway 251 in a direction towards the tip region 255. The tube lock 267 acts to restrict or prevent the small diameter tube 227 from moving in the opposite direction in the fluid dispenser 247. A substantially similar tube lock 267 can be positioned in the second opening 285 of the tee fitting 281 to control the advance of the small diameter tube 227 through the second opening. The tube lock 267 in the second opening 285 is designed to allow the small diameter tube to be advanced in a direction through the second opening towards the interior of the container 207. The tube lock 267 in the second opening will prevent or restrict the small diameter tube 227 from being advanced from the second opening 285 in a direction away from the interior of the container 207.

The small diameter tube 227 extends from the container 207, through the pump 245, through the fluid dispenser 247 and delivers the fluid directly to the applicator pad 265. The fluid is contained in the small diameter tube 227 until the fluid is delivered to the applicator pad 265. The fluid does not come into contact with any of the components of the fluid delivery system other than the small diameter tube 227 and the applicator tip 261. The small diameter tube 227 has a substantially constant diameter and the fluid moves through the tube with a substantially uniform flow rate. The uniform flow rate acts to prevent the build up of fluid, fillers in the fluid and/or contaminants in the small diameter tube 227. The uniform flow rate in the small diameter tube 227 acts to wash the tube and prevent build up of particles that can impair the flow of fluid through the fluid delivery system 203. The small diameter tube 227 and the fluid applicator tip 261, the components that deliver the fluid from the container 207 to the object to be coated are relatively low cost components that are easily replaceable in the fluid delivery system 203.

In operation the fluid supply system is utilized by placing the container 207 on the securing device 221 and engaging the securing device to securely position the container 207 in the securing device. The container 207 can be actual container that is used by the manufacturer to deliver the fluid to customers. The closure on the container 207 is removed and replaced with the closure 275. Once the closure 275 is positioned on the container 207 the small diameter tube 227 can be inserted into the second opening 285 in a direction through the tube lock 267 and the Tee fitting 281 so that the small diameter tube enter the interior of the container 207 and come into fluid communication with the fluid located in the container. The small diameter tube 227 is then positioned in the positive displacement pump 245 wherein the positive displacement pump can act upon the small diameter tube to advance fluid from the container 207. The small diameter tube is then inserted through the passageway 251 in the fluid dispenser 247 in a direction towards the tip region 255. The tube lock 267 can be used in the fluid dispenser 247 to prevent the small diameter tube 227 from being advanced in the fluid dispenser 247 in a direction away from the tip region 255. The small diameter tube 227 should extend the entire length of the tip region 255 and into the cavity 263 defined by the fluid applicator tip 261. To facilitate the positioning of the small diameter tube 227 in the fluid dispenser 247 it has been found useful to advance the small diameter tube through the fluid dispenser 247 so that the small diameter tube extends from the tip region 255. The small diameter tube 227 can then be trimmed flush with the end of the tip region 255 using a knife or other cutting device. The cavity 263 in the fluid applicator tip 261 is sized to snugly engage the small diameter tube 227 so that fluid supplied through the small diameter tube 227 is supplied directly to the applicator pad 265 on the applicator tip 261.

To pump fluid from the container 207 the closeable opening 239 on the desiccant container 231 is opened to expose the desiccant container to the atmosphere. The positive displacement pump 245 can then be engaged to act upon the small diameter tube 227 to pump fluid from the container 207. The pump acts upon the tube to advance the fluid but the fluid does not come into direct contact with the components of the pump 245. The pump 245 is activated to deliver a precise amount of fluid to the applicator tip 261. The speed of the positive displacement pump 245 can be controlled or adjusted to provide an exact metered volume of fluid to the applicator tip. As fluid is pumped from the container 207 makeup air can be drawn through the closeable opening 239 on the desiccant container 231 to provide makeup air in the interior of the container 207. Since the air is passing through the desiccant container 231, moisture will be removed from the air and effectively no moisture will enter the container 207 that could contaminate the fluid contained therein. The fluid from the container 207 passes through the tube 227 and into the fluid dispenser 247. As the small diameter tube 227 extends all the way through the fluid dispenser 247 and into engagement with the cavity 263 in the applicator tip 261, all of the fluid is delivered directly to the applicator pad 265 for the applicator tip 261. In most applications, it will be desirable to activate the shaking mechanism 223 to slightly agitate the fluid in the container 207 during the application of the fluid to the object that is to be coated.

The fluid that is used to coat the object is usually difficult to clean from the fluid supply system. The coating fluids can be very reactive wherein they setup readily when exposed to atmospheric conditions making it difficult to clean pumps and fluid applicator devices that are used to supply and apply the fluid to the object. In the present fluid supply system, the fluid only comes into contact with the small diameter tube 227 that passes through the fluid supply system. When it is time to clean the fluid supply system of the present invention, the small diameter plastic tubing 227 and closure 275 can be removed from the container 207. It is desirable to have the pump 245 impinge upon the small diameter tube to act as a check valve that assists in retaining the fluid in the small diameter tube 227. When the pump 245 constricts the small diameter tube 227, it restricts the ability of the fluid to move in the small diameter tube 227 until the impingement on the small diameter tube is released. The end of the small diameter tube 227 that extends into the container can be wiped clean with a disposable cloth as the tube is removed from the container. The small diameter tube 227 is also removed from the fluid dispenser 247 with the fluid dispenser elevated so that fluid does not escape from the small diameter tube. The ends of the small diameter tube 227 can be placed at an elevation that prevents fluid from being discharged from the small diameter tube or the ends of the small diameter tube can be placed in an appropriate receptacle and the fluid allowed to drain from the small diameter tube. In most cases, it is preferable to allow the fluid to cure and harden in the small diameter tube 227 prior to disposing of the small diameter tube. Once the fluid has cured and hardened, the small diameter tube can be removed from the closure 275 without contaminating the closure. If the small diameter tube locks 267 are used on the closure 275 and the fluid dispenser 247, it will be necessary to advance the small diameter tube 227 in the proper direction to remove the small diameter tube. As all of the fluid is retained in the small diameter tubing 227, it is not necessary to clean the component parts of the fluid supply system 203. This is a major advantage as it is frequently necessary to use volatile solvents to clean the fluids that are used to coat an object. When it is desired to use the fluid supply system 203 to again supply fluid to coat an object, it is only necessary to supply a new small diameter tube 227 to the system. The tube can be readily inserted into the Tee fitting 281 in the closure 275 on the container 207 and fed through the positive displacement pump 245. It is also easy to feed the small diameter tube 227 into the fluid dispenser 247 to have the small diameter tube 227 engage the cavity 263 on the fluid applicator tip 261. The length of small diameter tubing 227 that is necessary can be premeasured and precut to facilitate the installation of the tubing. Since the desiccant container 231 never comes into the contact with the fluid, it is not necessary to clean or replace this portion of the fluid supply system 203, until its service life is over.

The small diameter tube 227 used in this supply system usually has a diameter from about $\frac{1}{16}$ to about $\frac{5}{16}$ of an inch. In practice, it has been found preferable to use a tube having a diameter of $\frac{5}{32}$ of an inch. The small diameter tube 227 is particularly useful with a fluid having a relatively low viscosity. Fluid with a water like viscosity works particularly well with the small diameter tube 227. If the viscosity of the fluid is too high it will be difficult to move the fluid through the small diameter tubing. For such higher viscosity fluids, the fluid supply system previously described in this patent application is more suitable. The fluid will be retained in the tube 227 until it is removed from the positive displacement pump 245. The pump also acts on the small diameter tube 227 and constricts the tube in a manner that restricts the flow of the fluid in the small diameter tube and acts to retain the fluid in the tube 227 which assists during removal of the small diameter tube 227 during the cleaning of the system.

The small diameter of the tube 227 and the controlled pumping action of the positive displacement pump supply just the desired metered amount of fluid to the applicator tip 261. Since there is essentially no oversupply of fluid, this is a very efficient system. As many of the fluids that are used to coat an object are very volatile and release objectionable vapors, the precise supply of fluid greatly reduces the vapors emitted to the atmosphere during the coating operation and provides a constant, precise coverage on the object that is coated.

All of the components that are used to supply fluid and to coat the object are disposable. The small diameter tube 227 and the applicator tip 261 can be removed from the fluid supply system 203 and thrown away. As the fluid does not come into contact with any other parts of the fluid supply system (other than the container 207 for the fluid) there is no need to clean or replace any of the components of the system 203 due to contamination from the coating fluid. Because the original shipping container for the fluid can be used, there is no need to transfer the fluid to another container and contaminate the fluid. Accordingly, it is not necessary to use any objectionable solvents to clean the components of the system 203. In addition the small diameter tube 227 and applicator tip 261 are low cost components that are not expensive or difficult to replace. The elimination of clean up cost and difficulties more than offsets the cost of the small diameter tube 227 and applicator tip 261 that are replaced. In fact the applicator tip 261 would normally be replaced if the system 203 is not used for a period of time that requires replacing the tube 227.

Figure 28:
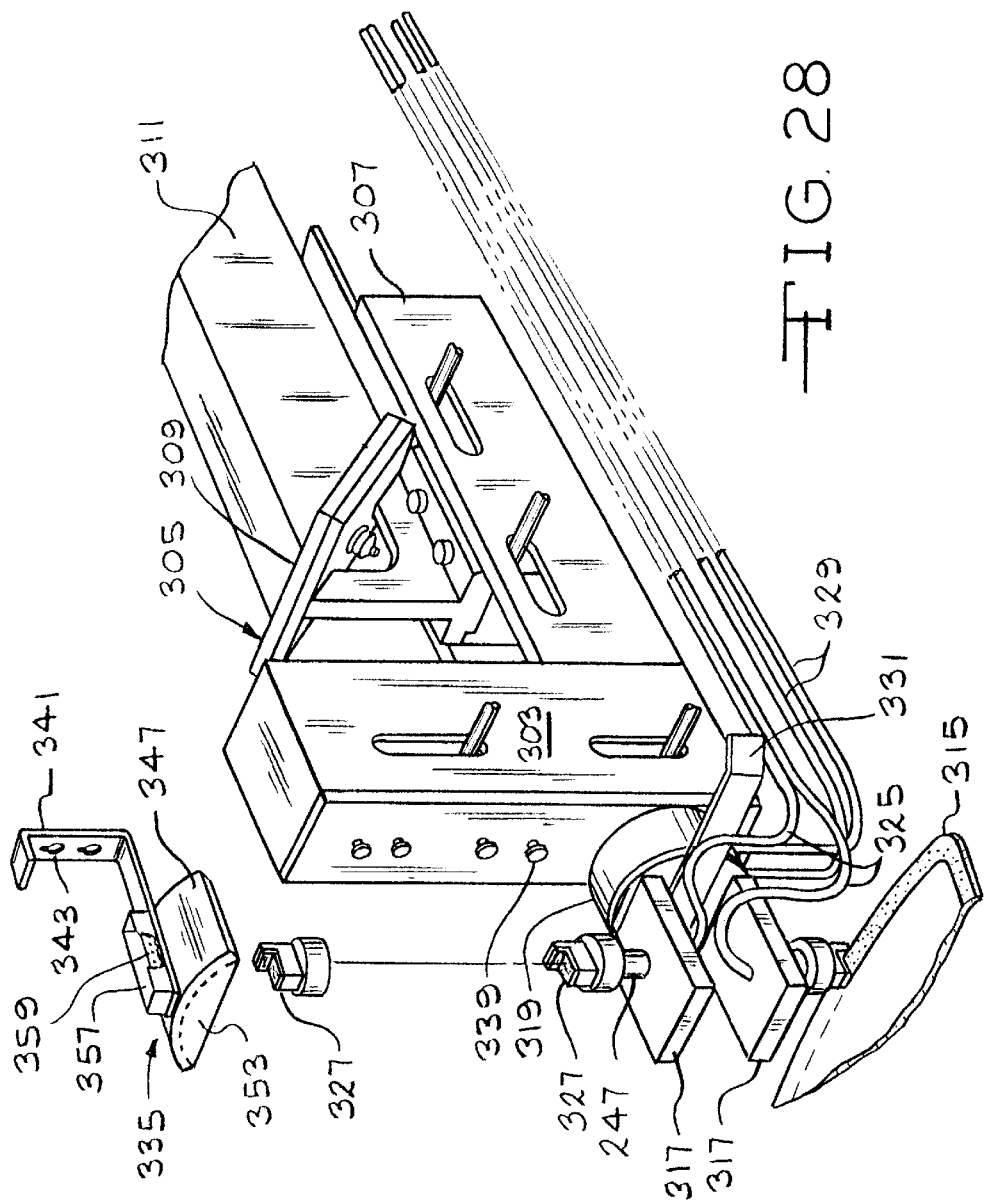
FIG. 28 is a perspective view of another feature of the invention.
Figure 29:
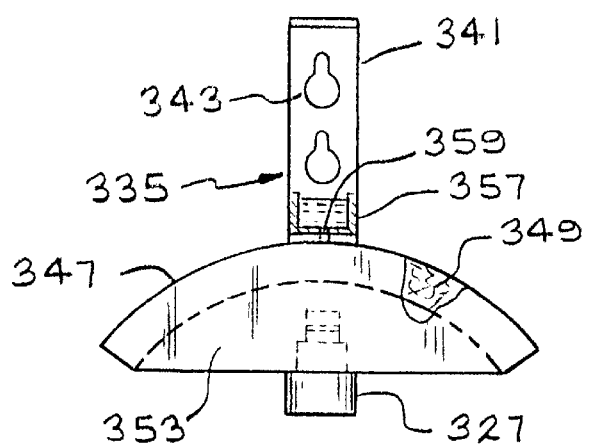
FIG. 29 is a partial enlarged front elevation view of the feature of FIG. 28.

FIGS. 28 and 29 show additional features of the automated system that can be utilized to apply a fluid to an object. In this example a compliance mechanism 305 that is essentially the same as the compliance mechanisms previously disclosed in this patent application is releasably secured by mounting means 309 to support arm 311. The box design compliance mechanism has protective panels along the sides of the compliance mechanism 305 to reduce contamination on the moving parts of the compliance mechanism from contaminates in the atmosphere. The compliance mechanism has a first leg 303 and a second leg 307 as previously described. The second leg 307 is connected to the mounting means 309. A rotary actuator 319 is positioned on the first leg 303 of the compliance mechanism 305. A fluid applicator tip 327 is mounted on fluid dispenser 247 that is mounted on a plate 317 that extends in a direction away from the compliance mechanism 305 on each side of the rotary actuator 319. The fluid applicator tips 327 are disposed substantially 180° apart on the rotary actuator. Supply lines 325 are used to supply the fluid that is used to coat the object 315 with fluid. The supply lines 325 are small diameter tubing similar to the tubing described with regard to the fluid supply system 203 shown in FIG. 26. With that configuration for the fluid supply, the supply lines 325 extend through the plates 317 and extend directly into the applicator tip 327 to supply fluid to the applicator tip. The plates 317 are sized to space the applicator tip 327 from the compliance mechanism 305 as the applicator tips are rotated by the rotary actuator 319. The size of the plates 317 is dictated by the size of the applicator tips 323. The applicator tips have a brush or pad 327 for applying fluid to the object 315 as previously described in this patent application. Drive lines 329 can be used to supply fluid under pressure to rotary actuator 319 to cause the rotary actuator to rotate. However, it should be understood that other drive means can be utilized to cause the rotary actuator 319 to rotate. The rotary actuator 319 is designed so that it will rotate through 180° arc so that each fluid applicator tip 323 can be brought into position adjacent the object 315 so that each applicator tip can be used to apply a fluid to the object 315. The applicator tips can apply the same fluid to the object 315 or they can apply different fluids to the object. It is also possible that the applicator tips can have a different configuration so that each applicator tip will apply a different layer of fluid to the object 315. Appropriate stop mechanisms (not shown) can be utilized with the rotary actuator 319 to limit the degree of rotation of the rotary actuator to the desired positions. As previously described, the rotary actuator is usually limited to movement through a 180° arc. To facilitate the rotation of the rotary actuator 319, the supply lines 325 are provided with enough length to rotate with the rotary actuator 319 through its arc of rotation. A guide for 331 can be connected to the rotary actuator 319 to engage the supply lines 325 to keep the lines in the desired position during rotation of the rotary actuator 319.

A docking station 335 is positioned on the first leg 303 of the compliance mechanism 305. The docking station 335 is removably positioned on the first leg 303 in spaced apart adjacent relationship with the rotary actuator 319. The first leg 303 of the compliance mechanism 305 has a series of mounting pins 339 positioned thereon. The docking station 335 has a mounting bracket 341 having mounting holes 343 positioned in the mounting bracket 341. The mounting holes 343 as designed to engage the mounting pins 339 on the first leg 303 of the compliance mechanism 305. The engagement of the mounting pins 339 by the mounting holes 343 acts to secure the docking station 335 to the compliance mechanism 305. The mounting bracket 341 can be moved along the first leg 303 of the compliance mechanism to engage the desired mounting pins 339 so that the docking station 335 is in the desired position with respect to the fluid applicator tips 327 positioned on the rotary actuator 319. The docking station 335 has an arcuate member 347 that is attached to the mounting bracket 341. The arcuate member has a solvent pad 349 that is positioned on the side of the arcuate member 347 that faces the fluid applicator tips 327. A plate 351 is positioned at each end of the arcuate member 347 to enclose the ends of the arcuate member and to define a chamber 353 that can be disposed around a fluid applicator tip 327 when the tip is not being used to apply a layer of fluid to an object 315.

Positioned on the side of the arcuate member 347 that is opposite to the solvent pad 349 is a solvent reservoir 357. A plurality of apertures 359 are positioned in the arcuate member 347 to be in alignment with the solvent reservoir 357. The plurality of apertures 359 provide a path of communication from the solvent reservoir 357 to the solvent pad 349 located on the opposite side of the arcuate member 347. The arcuate member 347 is sized so that the chamber 353 formed by the arcuate member and the end plates 351 is of sufficient size to accommodate the fluid applicator tips 327 that are used to apply a layer of fluid to the object 315.

In operation, the mounting bracket 341 will be positioned on the mounting pins 339 to position the chamber 353 immediately adjacent the fluid applicator tip 327 that is not being used to coat the object 315. A quantity of solvent will be positioned in the solvent reservoir 357 and the solvent will pass through the plurality of apertures 359 in the arcuate member 347 so that the solvent will saturate the solvent pad 349. The pad 349 will wick the solvent from the reservoir 357 and the solvent will be held in the pad. The solvent that is used to saturate the solvent pad 349 will migrate from the solvent pad and create a solvent saturated atmosphere in the chamber 353 where the fluid applicator tip 327 is positioned. The solvent saturated atmosphere will act upon the applicator pad 321 to prevent the fluid on the applicator pad 321 from drying out or becoming contaminated when the applicator tip is not being used to apply a fluid layer to the object 315. The solvent vapor is usually lighter than air so that the solvent atmosphere in the chamber 353 will generally be retained in the chamber 353 by the placement of the arcuate member 347 and the end plates 351. Accordingly, there is a little solvent saturated air that will escape the chamber 353.

Figure 30:
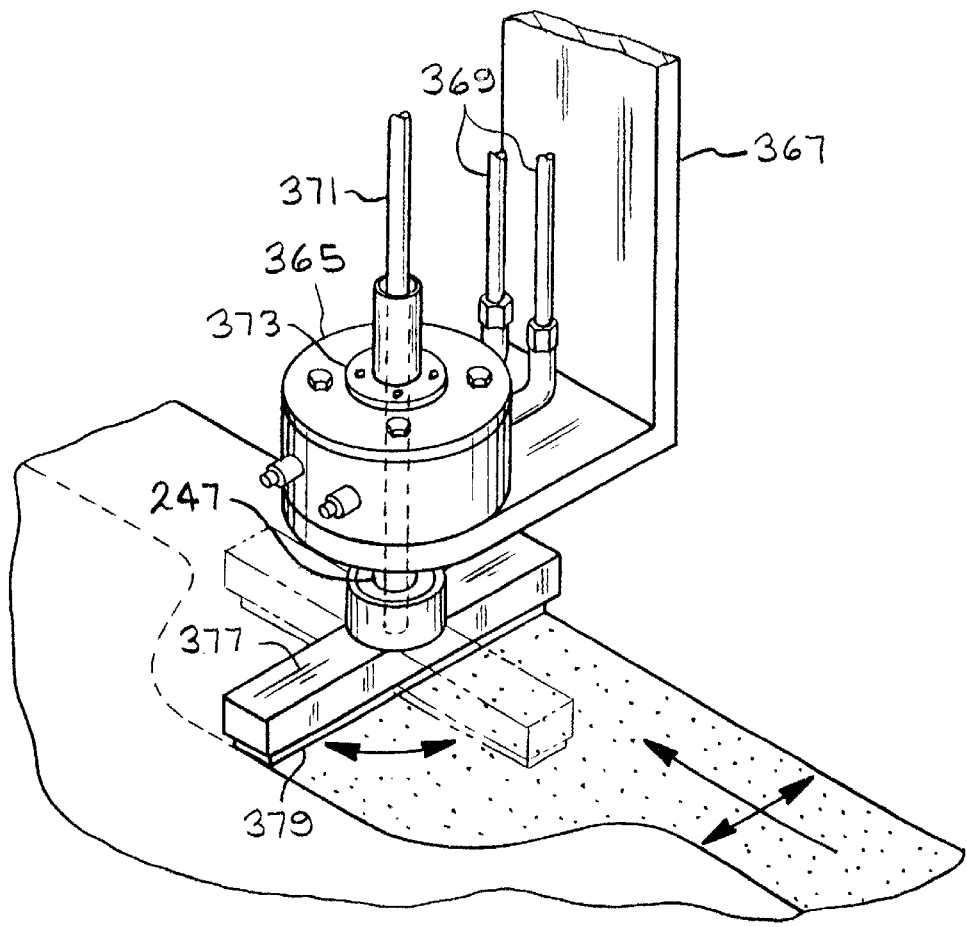
FIG. 30 is a perspective view of another feature of the invention.
Figure 31:
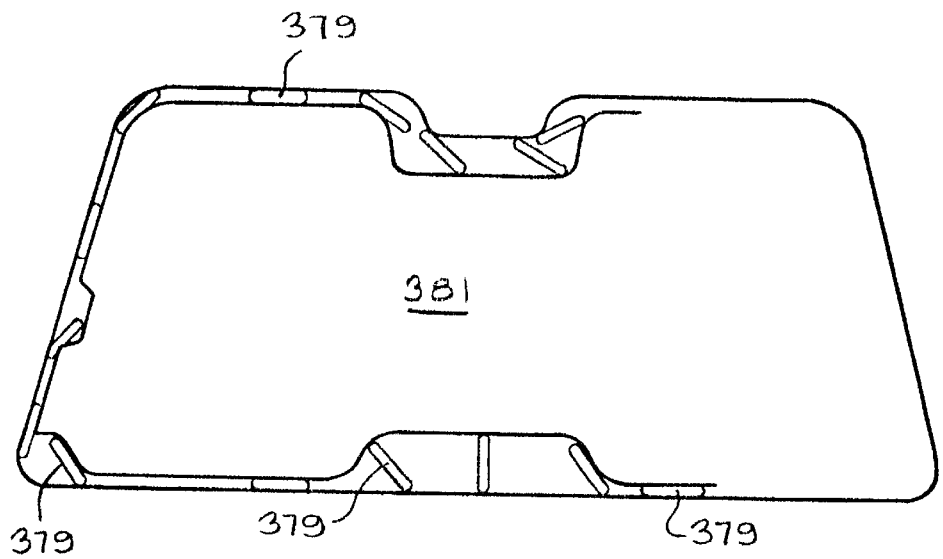
FIG. 31 is a front elevation view showing the feature of FIG. 30.

FIGS. 30 and 31 show another application of a rotary actuator that can be utilized to apply a fluid layer to an object. In FIG. 30 the rotary actuator 365 is mounted on a support bracket 367. The support bracket 367 is usually mounted on one leg of a compliance mechanism as previously described. Drive lines 369 are connected to the rotary actuator 365 to cause the rotary actuator to rotate in a manner well known in the art. It should also be understood that a stepper motor or a servo mechanism could be used to rotate the rotary actuator. A small diameter tube 371 passes through the portion of the rotary actuator 365 that is caused to rotate. The small diameter tube 371 is secured to the rotational portion 373 of the rotary actuator 365 that is caused to rotate by the fluid supplied through the drive lines 369. The small diameter tube 371 extends through the rotary actuator 365 and the end of the small diameter tube 371 extends through a fluid dispenser 247 and into a fluid applicator tip 377 as previously described. The fluid applicator tip shown in FIG. 30 is relatively long and has a long applicator pad 370 that is used to apply a layer of fluid to an object 381 as shown in FIG. 31.

In operation, fluid is supplied to the small diameter tube 371 in a manner previously described to provide fluid to the applicator pad 379 of the fluid applicator tip 377. The applicator pad 379 as shown in FIG. 31 can be positioned to apply a layer of fluid to the object 381 that has a specified width. If it is necessary to change the width of the layer of fluid, the fluid actuator 365 can be activated to rotate the rotational portion 373 causing the small diameter tube 371 to rotate which in turn causes the fluid applicator tip 377 to rotate. As the fluid applicator tip rotates, the position of the applicator pad 379 with respect to the object 381 can be changed to vary the width of the fluid layer that is applied to the object. A controller (not shown) can be programmed to position the applicator tip in the desired location on a particular portion of the object 381.

It is also possible to mount the support bracket 367 on a rotary actuator (not shown) so that the fluid applicator tip 377 can be moved into and out of position adjacent the object 381. In fact, a support bracket 367 can extend from each side of the rotary actuator (not shown) so that different fluid applicator tips can be brought into position adjacent the object 381. This will allow the different applicator tips to provide different fluids to the object or to have applicator tips with different shapes as previously described.

Figure 32:
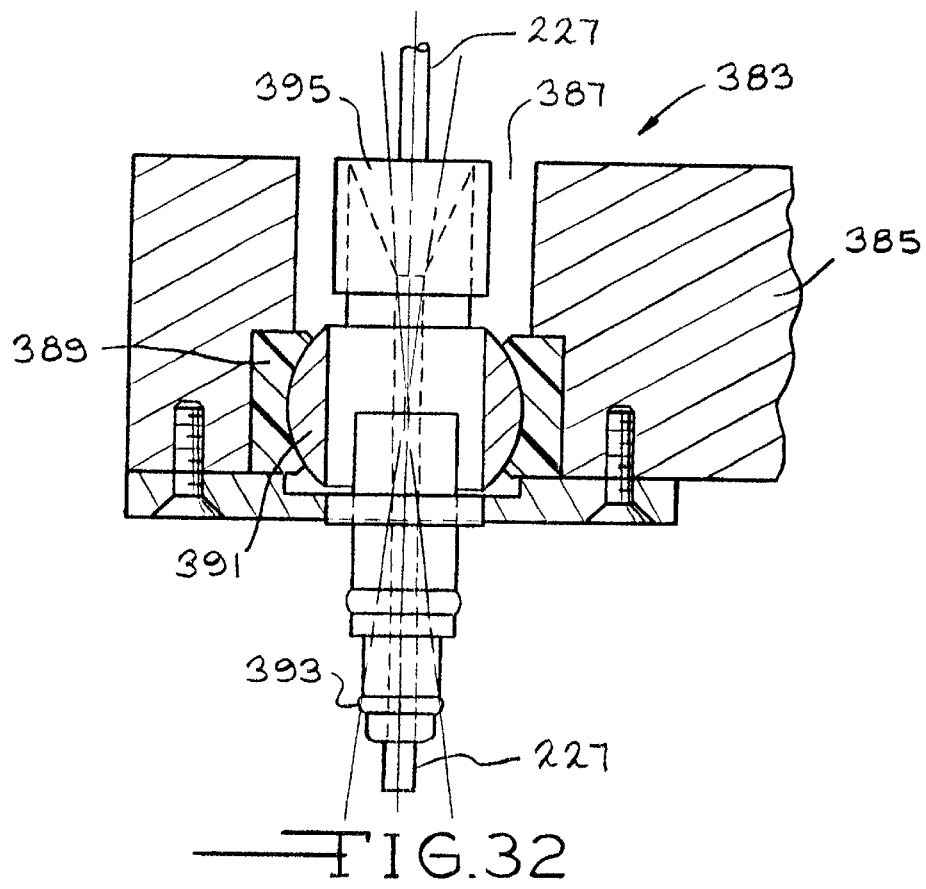
FIG. 32 is a cross sectional view of another feature of the invention.

FIG. 32 shows another feature of a fluid dispenser that can be used with the fluid apply systems shown in FIGS. 26–31. The fluid dispenser 383 has a body 385 that defines a cavity 387. A spherical bearing 389 is positioned in the cavity 387. A swivel 391 is matingly positioned in the spherical bearing 389. The swivel portion is free to move in one direction in the swivel bearing 389 as shown by the broken lines in FIG. 32. The swivel member 391 has tip region 393 that extends from the body 385. The tip region 393 is designed to have a fluid applicator tip (not shown but as previously described) positioned on the tip region. A passageway 395 extends through the swivel member 391 and the passageway is designed to receive a small diameter tube 227 as previously described. The small diameter tube 227 is used to supply fluid to the fluid dispenser and fluid applicator tip in the manner previously described. The swivel member 391 provides a small amount of movement in one direction that allows the applicator tip to accommodate small irregularities or changes in the object that is to be coated with a fluid. The fluid dispenser 383 is usually used with a compliance mechanism as previously described. The compliance mechanism provides compensating movement in two directions to accommodate irregularities or changes in the object that is being coated. Usually the swivel member 391 is positioned in the fluid dispenser 383 to provide compensating movement in another direction than that provided for the compliance mechanism. However, it should be understood that the fluid dispenser 383 can be used separately from a compliance mechanism if desired. The small diameter tube 227 that extends through the passageway 395 acts as a spring or resistance means to center the swivel member 391 in the cavity 387 in the body 385. If the swivel member 391 is displaced from this central position in the cavity 387, the resilient nature of the tube 227 will apply a biasing force on the swivel member to urge the swivel member back into the central position. A resilient elastomer or plastic foam washer could also be used if more centering force is required.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A system for applying a fluid to an object comprising:
    a container for supplying said fluid, said container having an opening at one end and a closure that closes said opening, said closure having a first port that passes through said closure, said closure having a second port that is in communication with the atmosphere to allow air to enter said container;
    an applicator tip to apply said fluid to the object;
    a small diameter tube passing through said first port on said closure and into communication with said fluid in said container, said small diameter tube extending from said container to said applicator tip to supply fluid to said applicator tip for applying said fluid to the object, air enters said second port in said closure and said container as said fluid in said container is removed through said small diameter tube;
    a desiccant container connected to said second port whereby moisture is removed from said air that enters said container through said second port; and
    a pump operatively connected to said tube whereby said pump acts to move said fluid from said container, along said tube to said applicator tip.

2. The system of claim 1 wherein said small diameter tube has a diameter from about 1/16 to about 5/16 of an inch.

3. The system of claim 1 wherein a fluid dispenser is provided that includes a tip region, said tip region being designed so that said applicator tip can be removably positioned on said tip region, said fluid dispenser defining a passageway that extends through said tip region to supply fluid to said applicator tip, said small diameter tubing extending through said passageway to supply fluid to said applicator tip.

4. The system of claim 3 wherein said fluid dispenser includes a tube lock that allows said tube to be inserted into said passageway in a direction whereby said tube can only be advanced through said tip region in a direction towards said applicator tip.

5. The system of claim 4 wherein said tube lock prevents said small diameter tubing from being removed from said fluid dispenser when said applicator tip is on said fluid applicator.

6. The system of claim 3 wherein said applicator tip defines a cavity that is in fluid communication with the passageway in said fluid applicator, said small diameter tubing extending into said cavity in said applicator tip to supply said fluid directly to said applicator tip.

7. The system of claim 6 wherein said cavity is designed to snugly engage said small diameter tubing whereby said fluid supplied through said small diameter tubing is directed only to said applicator tip.

8. The system of claim 7 wherein said small diameter tubing extends from said tip region of said fluid dispenser and into said cavity in said applicator tip.

9. The system of claim 1 wherein said pump is a positive displacement pump.

10. The system of claim 1 wherein said pump is a peristaltic pump.

11. The system of claim 10 wherein said peristaltic pump acts upon said small diameter tubing to advance said fluid from said container to said applicator tip.

12. The system of claim 1 wherein said container is mounted on a shaker whereby the fluid in said container can be shaken during application of said fluid to the object.

13. The system of claim 9 wherein said positive displacement pump engages and constricts said small diameter tube when said positive displacement pump is not activated to pump fluid through said small diameter tube.

14. A system for applying a fluid to an object comprising:

a container for supplying said fluid;

said container having an opening at one end and a closure that closes said closure having a first port that passes through said closure, said closure having a fitting that is disposed in communtcation with said first port;

a tee fitting having three openings being secured with one of said openings being in engagement with said fitting on said closure;

an applicator tip to apply said fluid to the object;

a small diameter tube extending through one of said other openings in said tee fitting, and extending through said tee fitting, said fitting on said closure, said first port said closure and into said container, said small diameter tube extending from said container to said applicator tip to supply fluid to said applicator tip for applying said fluid to the object; and a pump operatively connected to said tube whereby said pump acts to move said fluid from said container, along said tube to said applicator tip.

15. The system of claim 14 wherein said small diameter tube has a diameter from about 1/16 to about 5/16 of an inch.

16. The system of claim 14 wherein a fluid dispenser is provided that includes a tip region, said tip region being designed so that said applicator tip can be removably positioned on said tip region, said fluid dispenser defining a passageway that extends through said tip region to supply fluid to said applicator tip, said small diameter tubing extending through said passageway to supply fluid to said applicator tip.

17. The system of claim 16 wherein said fluid dispenser includes a tube lock that allows said tube to be inserted into said passageway in a direction whereby said tube can only be advanced through said tip region in a direction towards said applicator tip.

18. The system of claim 17 wherein said tube lock prevents said small diameter tubing from being removed from said fluid dispenser when said applicator tip is on said fluid applicator.

19. The system of claim 16 wherein said applicator tip defines a cavity that is in fluid communication with the passageway in said fluid applicator, said small diameter tubing extending into said cavity in said applicator tip to supply said fluid directly to said applicator tip.

20. The system of claim 19 wherein said cavity is designed to snugly engage said small diameter tubing whereby said fluid supplied through said small diameter tubing is directed only to said applicator tip.

21. The system of claim 20 wherein said small diameter tubing extends from said tip region of said fluid dispenser and into said cavity in said applicator tip.

22. The system of claim 14 wherein said pump is a positive displacement pump.

23. The system of claim 14 wherein said pump is a peristaltic pump.

24. The system of claim 23 wherein said peristaltic pump acts upon said small diameter tubing to advance said fluid from said container to said applicator tip.

25. The system of claim 14 wherein said closure has a second port that is in communication with the atmosphere to allow air to enter said container as said fluid in the container is removed through said small diameter tubing.

26. The system of claim 25 wherein a desiccant container is connected to said second port whereby moisture is removed from said air that enters said container through said second port.

27. The system of claim 14 wherein said opening on said tee fitting through which said small diameter tubing extends sealing around said small diameter tubing to substantially prevent air from entering into said tee fitting through the opening containing said small diameter tubing.

28. The system of claim 27 wherein said remaining opening on said tee fitting is operatively connected desiccant container, said desiccant container being open to the atmosphere whereby moisture is removed from the air that enters said tee fitting and through said tee fitting to said container.

29. The system of claim 28 wherein the opening on said tee fitting that is connected to said desiccant container being sealed to said desiccant container to substantially prevent air from entering into said tee fitting except through said desiccant container.

30. The system of claim 14 wherein said tee fitting has a tube lock that engages said small diameter tube and allows said small diameter tube to be advanced through said tee fitting in a direction towards said container.

31. The system of claim 14 wherein said container is mounted on a shaker whereby the fluid in said container can be shaken during application of said fluid to the object.

32. The system of claim 22 wherein said positive displacement pump engages and constricts said small diameter tube when said positive displacement pump is not activated to pump fluid through said small diameter tube.

\* \* \* \* \*

UNITED STATES PATENT AND TRADEMARK OFFICE
CERTIFICATE OF CORRECTION

PATENT NO. : 6,641,665 B2
DATED : November 4, 2003
INVENTOR(S) : Wallace F. Krueger It is certified that error appears in the above-identified patent and that said Letters Patent is hereby corrected as shown below:

Column 27,
Line 36, insert -- opening, said -- after "that closes said" and before the words "closure having a first port that passes".
Line 47, insert -- in -- between the words "port" and "said".

Signed and Sealed this

Twenty-seventh Day of January, 2004

JON W. DUDAS
*Acting Director of the United States Patent and Trademark Office*